United States Patent
Tanaka et al.

(10) Patent No.: US 10,021,261 B2
(45) Date of Patent: Jul. 10, 2018

(54) IMAGE FORMING APPARATUS

(71) Applicant: CANON KABUSHIKI KAISHA, Tokyo (JP)

(72) Inventors: Masanobu Tanaka, Kashiwa (JP); Yasuharu Chiyoda, Nagareyama (JP); Oki Kitagawa, Nagareyama (JP); Asuna Fukamachi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/354,799

(22) Filed: Nov. 17, 2016

(65) Prior Publication Data
US 2017/0142278 A1    May 18, 2017

(30) Foreign Application Priority Data
Nov. 18, 2015 (WO) .................. PCT/JP2015/082350

(51) Int. Cl.
*G06F 15/00* (2006.01)
*H04N 1/00* (2006.01)
(Continued)

(52) U.S. Cl.
CPC ......... *H04N 1/00891* (2013.01); *G03G 15/50* (2013.01); *G03G 15/5016* (2013.01);
(Continued)

(58) Field of Classification Search
CPC . G03G 15/50; G03G 15/5016; G03G 15/5058
(Continued)

(56) References Cited

U.S. PATENT DOCUMENTS 5,857,131 A * 1/1999 Hasegawa .............. G03G 15/50
399/43
2014/0092414 A1* 4/2014 Tezuka ............... H04N 1/00395
358/1.13

FOREIGN PATENT DOCUMENTS

JP    2006-208668 A    8/2006
JP    2008-020790 A    1/2008
(Continued)

OTHER PUBLICATIONS

Machine translation of Japanese Patent Document No. 2006-208668, Noguchi et al., Jan. 27, 2005.*

*Primary Examiner* — Mark R Milia
(74) *Attorney, Agent, or Firm* — Canon U.S.A., Inc. IP Division

(57) ABSTRACT

An image forming apparatus includes an image forming unit, a human-body detection unit, an instruction receiver, and a controller. The controller determines whether an adjustment process is to be performed in accordance with a result of a determination, at an end of an image forming process, as to whether a human body is detected. The controller executes the adjustment process when the image forming process is terminated where the human-body detection unit does not detect a human body. The controller starts the image forming process before the adjustment process is executed where a human body is detected and the image forming instruction is received within a predetermined period. The controller executes the adjustment process when the predetermined period has elapsed while the image forming instruction is not received after the end of the image forming process where the human-body detection unit detects a human body.

23 Claims, 13 Drawing Sheets

(51) Int. Cl.
*G03G 15/00* (2006.01)
*G06K 9/00* (2006.01)
*H04N 1/06* (2006.01)
*H04N 1/113* (2006.01)
*H04N 1/29* (2006.01)

(52) U.S. Cl.
CPC ..... *G03G 15/5058* (2013.01); *G06K 9/00362* (2013.01); *H04N 1/06* (2013.01); *H04N 1/113* (2013.01); *H04N 1/29* (2013.01); *G03G 2215/0129* (2013.01); *H04N 2201/0082* (2013.01); *H04N 2201/0093* (2013.01)

(58) Field of Classification Search
USPC ....................................................... 358/1.14
See application file for complete search history.

(56) References Cited

FOREIGN PATENT DOCUMENTS

| | | |
|---|---|---|
| JP | 2009-202500 A | 9/2009 |
| JP | 2010-145907 A | 7/2010 |
| JP | 2013-029839 A | 2/2013 |
| JP | 2014-197172 A | 10/2014 |
| JP | 2015-161713 A | 9/2015 |

\* cited by examiner

IMAGE FORMING APPARATUS

BACKGROUND OF THE INVENTION

Technical Field

Aspects of the present invention relate to an image forming apparatus having a human-body detection function.

Background Art

In recent years, image forming apparatuses which include a human-body detection sensor which detects a person who comes close to the image forming apparatuses and automatically recover from a power-saving state to a normal power state have been proposed, such as an image forming apparatus disclosed in Japanese Patent Laid-Open No. 2013-029839.

Furthermore, Japanese Patent Laid-Open No. 2015-161713 discloses an image forming apparatus which suspends execution of a calibration process when a motion sensor detects a user at a preset time of start of processing and executes the calibration process after the user moves away.

As a timing when an adjustment process is executed, a timing when a print operation (an image forming process) is terminated may be set. However, a next print operation may not be started while the adjustment process is performed. Therefore, even if a user who desires to start a next print operation (copy out, for example) exists near the image forming apparatus, the next print operation may not be started until the adjustment process is terminated. Consequently, a waiting time before the user obtains a first output object may be increased.

On the other hand, according to PTL 2, an adjustment process to be executed at a timing when a preceding printing operation is terminated may not be executed at the timing but may be suspended. However, the adjustment process is suspended while detection of a user is performed, and accordingly, image quality may be degraded.

SUMMARY OF INVENTION

Accordingly, embodiments of the present invention reduce possibility of degradation of image quality while suppressing increase of a waiting time which lasts until a user who desires to start a next image forming process after a certain image forming process is terminated obtains a first output object. In other words, increase of a waiting time before the user who desires to start a next image forming process after an end of a certain image forming process obtains a first output object is suppressed.

According to a first embodiment of the present invention, an image forming apparatus includes an image forming unit configured to form an image on a recording material, a human-body detection unit configured to detect a human body in a predetermined region, an instruction receiver configured to receive an image forming instruction, and a controller configured to determine whether an adjustment process is to be performed by the image forming unit in accordance with a result of a determination, at an end of an image forming process performed by the image forming unit, as to whether the human-body detection unit has detected a human body, wherein the controller executes the adjustment process when the image forming process is terminated in a case where the human-body detection unit does not detect, at the end of the image forming process, a human body, wherein the controller starts the image forming process before the adjustment process is executed in a case where the human-body detection unit detects, at the end of the image forming process, a human body and the instruction receiver receives the image forming instruction within a predetermined period of time after the end of the image forming process, and wherein the controller executes the adjustment process when the predetermined period of time has elapsed while the instruction receiver does not receive the image forming instruction after the end of the image forming process in a case where the human-body detection unit detects, at the end of the image forming process, a human body.

A second embodiment provides an image forming apparatus comprising an image forming unit configured to form an image on a recording material, a human-body detection unit configured to detect a human body in a predetermined region, an instruction receiver configured to receive an image forming instruction, and a controller configured to determine whether an adjustment process is to be performed by the image forming unit in accordance with a result of a determination as to whether the human-body detection unit has detected a human body, wherein the controller executes the adjustment process when an image forming process is terminated in a case where the human-body detection unit does not detect, at an end of the image forming process performed by the image forming unit, a human body, wherein the controller starts the image forming process before the adjustment process is executed in a case where the human-body detection unit continuously detects, after the end of the image forming process, a human body and the instruction receiver receives the image forming instruction within a predetermined period of time after the end of the image forming process, and wherein the controller executes the adjustment process when the predetermined period of time has elapsed while the instruction receiver does not receive the image forming instruction after the end of the image forming process in a case where the human-body detection unit continuously detects, after the end of the image forming process, a human body.

A third embodiment provides an image forming apparatus comprising an image forming unit configured to form an image on a recording material, an image fixer configured to perform a process of fixing the image formed by the image forming unit on the recording material, a human-body detection unit configured to detect a human body in a predetermined region, an instruction receiver configured to receive an image forming instruction, and a controller configured to determine whether an adjustment process is to be performed by the image fixer in accordance with a result of a determination as to whether the human-body detection unit has detected a human body, wherein the controller executes the adjustment process when an image forming process is terminated in a case where the human-body detection unit does not detect, at an end of the image forming process performed by the image forming unit, a human body, wherein the controller starts the image forming process before the adjustment process is executed in a case where the human-body detection unit detects, at the end of the image forming process, a human body and the instruction receiver receives the image forming instruction within a predetermined period of time after the end of the image forming process, and wherein the controller executes the adjustment process when the predetermined period of time has elapsed while the instruction receiver does not receive the image forming instruction after the end of the image forming process in a case where the human-body detection unit detects, at the end of the image forming process, a human body.

A fourth embodiment provides an image forming apparatus comprising an image forming unit configured to form an image on a recording material, an image fixer configured to perform a process of fixing the image formed by the image forming unit on the recording material, a human-body detection unit configured to detect a human body in a predetermined region, an instruction receiver configured to receive an image forming instruction, and a controller configured to determine whether an adjustment process is to be performed by the image fixer in accordance with a result of a determination as to whether the human-body detection unit has detected a human body, wherein the controller executes the adjustment process when an image forming process is terminated in a case where the human-body detection unit does not detect, at an end of the image forming process performed by the image forming unit, a human body, wherein the controller starts the image forming process before the adjustment process is executed in a case where the human-body detection unit continuously detects, after the end of the image forming process, a human body and the instruction receiver receives the image forming instruction within a predetermined period of time after the end of the image forming process, and wherein the controller executes the adjustment process when the predetermined period of time has elapsed while the instruction receiver does not receive the image forming instruction after the end of the image forming process in a case where the human-body detection unit continuously detects, after the end of the image forming process, a human body.

A fifth embodiment provides an image forming apparatus comprising an image forming unit configured to form an image on a recording material, a human-body detection unit configured to detect a human body in a predetermined region, an instruction receiver configured to receive an image forming instruction, and a controller configured to selectively execute a first mode or a second mode, wherein, in the first mode, the controller executes the adjustment process when the image forming process is terminated in a case where the human-body detection unit does not detect, at an end of the image forming process performed by the image forming unit, a human body, the controller starts the image forming process before the adjustment process is executed in a case where the human-body detection unit has detected, at the end of the image forming process, a human body and the instruction receiver receives the image forming instruction within a predetermined period of time after the end of the image forming process, and the controller executes the adjustment process when the predetermined period of time has elapsed while the instruction receiver does not receive the image forming instruction after the end of the image forming process in a case where the human-body detection unit has detected, at the end of the image forming process, a human body, and wherein, in the second mode, the controller executes the adjustment process when the image forming process is terminated irrespective of whether the human-body detection unit has detected, at the end of the image forming process, a human body, and a selector configured to accept a determination as to whether the controller executes the first mode or the second mode.

Further features of the present invention will become apparent from the following description of exemplary embodiments with reference to the attached drawings.

DESCRIPTION OF EMBODIMENTS

Preferred embodiments of the present invention will be described in detail hereinafter with reference to the accompanying drawings. Note that components described in the embodiments are merely examples and the present invention is not limited to the components described in the embodiments.

First Embodiment (1) Entire Configuration of Image Forming Apparatus
<Entire Configuration of Image Forming Apparatus>

Figure 1:
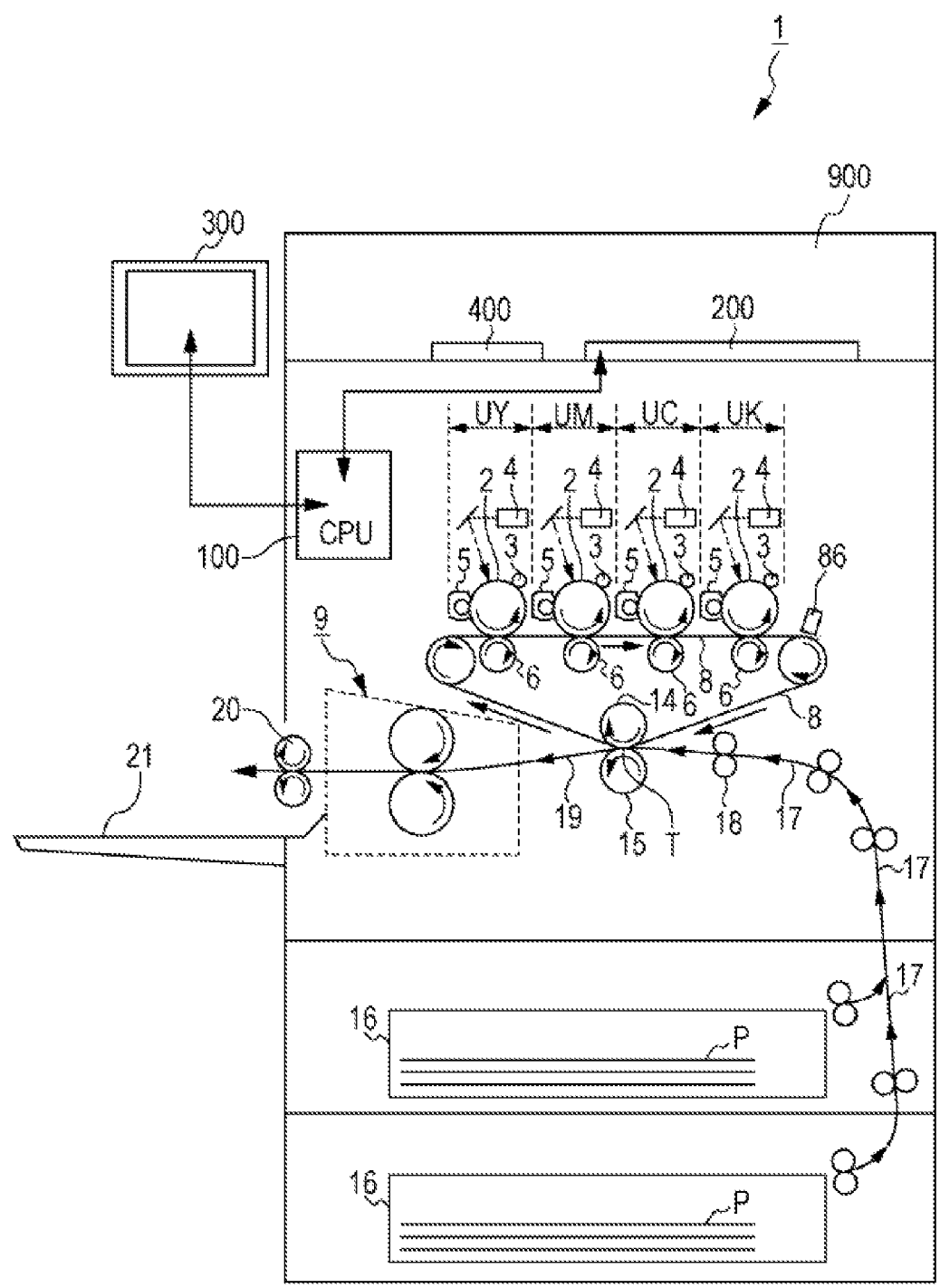
FIG. 1 is a cross-sectional view of an image forming apparatus.

FIG. 1 is a cross-sectional view of an image forming apparatus. An image forming apparatus 1 (hereinafter referred to as an "apparatus 1") is illustrated as a configuration of the image forming apparatus according to this embodiment. The apparatus 1 is an electrophotographic laser printer.

In the apparatus 1, a central processing unit (CPU) 100 receives a print job (an image forming instruction) from an operation unit 200 and an image forming unit executes an image forming process of forming an image on a sheet (a recording material) P. In the image forming apparatus, image information (an original image or original data) which is a base of the image to be formed on the sheet P is obtained from a scanner unit 900 or a host apparatus 300. The operation unit 200 includes a display panel and an operation key. An operator issues the image forming instruction to the apparatus 1 by pressing the operation key. Specifically, the operation unit 200 functions as a receiving unit (an instruction receiver) which receives the print job (the image forming instruction). Note that the display panel of the operation unit 200 may employ a touch panel method so as to function as the operation key.

The apparatus 1 includes the scanner unit 900. The scanner unit 900 functions as a reading unit which reads an original (an image formed on a recording material). The operation unit 200 receives an instruction for printing the image read by the scanner unit 900 issued by the operator. The apparatus 1 forms a toner image corresponding to image information of the original read by the scanner unit 900 on a sheet (a recording material) P when the operation unit 200 receives the image forming instruction.

Furthermore, the apparatus 1 is connectable to the host apparatus 300 through a network. The apparatus 1 may form a toner image corresponding to electric image information (original data) input from the host apparatus 300 connected to the apparatus 1 through the network in a communication available manner and output the formed toner image.

Note that the apparatus 1 may receive a print job (an image forming instruction) from the host apparatus 300. In this case, the CPU 100 which receives a signal from the host apparatus 300 through the network functions as a receiving unit which receives a print job (an image forming instruction). Note that, in a description below, an expression "receives a print job (an image forming instruction)" indicates reception of a print job (an image forming instruction) performed by the operation unit 200 unless otherwise noted.

The CPU 100 performs transmission and reception of electric signals with the host apparatus 300, the operation unit (a console unit) 200, a human-body detection sensor 400 described below, the scanner unit 900, and various image forming apparatuses, and controls execution of an image forming process of forming an image on the sheet P. Examples of the host apparatus 300 include a personal computer and a fax machine. Examples of the sheet P include paper, an overhead projector (OHP) sheet, a postcard, and an envelope, on which a toner image is formed by the apparatus 1.

The apparatus 1 includes, from an upstream side to a downstream side of a conveying path of a sheet, a sheet feeding mechanism 16, a conveying path 17, a diagonal conveying mechanism 18, a counter roller 14, a secondary transfer roller 15, a conveying path 19, a fixing device (a fixing unit, an image fixer) 9, an ejection roller pair 20, and a sheet ejection tray 21. The image forming unit means a configuration which forms an image on the sheet P (a recording material) and includes units UY, UM, UC, and UK, an intermediate transfer belt 8, the counter roller 14, the secondary transfer roller 15, and a conveying unit (the sheet feeding mechanism 16, the conveying path 17, and the diagonal conveying mechanism 18) which conveys the sheet P.

Each of the units UY, UM, UC, and UK includes a drum type electrophotographic photoreceptor (hereinafter referred to as a drum) 2 and a forming unit which forms an image (an unfixed toner image) on the drum 2. The units UY, UM, UC, and UK form respective toner images of yellow, magenta, cyan, and black. The units UY, UM, UC, and UK are arranged in a line in arbitrary order. The drums 2 are driven for rotation at a certain speed (a process speed) in directions of arrow marks in FIG. 1 by a driving unit (not illustrated). Furthermore, around each of the units UY, UM, UC, and UK, a charger 3, an exposure device 4, a developing device 5, a primary transfer roller 6, a cleaning device (not illustrated) are disposed as process units which act on the drum 2 in a drum rotation direction. The charger 3, the exposure device 4, and the developing device 5 function as the forming unit which forms a toner image (an image) on the drum 2 (the photoreceptor). These process units are identical in the units UY, UM, UC, and UK, and therefore, the same numbers are assigned.

The charger 3 is a charging unit which uniformly changes a surface of the rotating drum 2 so that the drum 2 has a certain polarity and a certain potential. The surface of the drum 2 is charged by an applied bias so as to have the certain polarity and the certain potential.

The exposure device 4 is an exposure unit (an exposure section) which exposes the drum 2 so that a latent image corresponding to image information is formed on a surface of the drum 2 which has been subjected to the charging process. In this embodiment, the exposure device 4 is a laser scanner which forms an image corresponding to an image signal supplied from the CPU 100. The laser scanner performs scanning on a rotating polygon mirror using a laser beam which has been modulated and which is emitted from a laser light source in accordance with the image signal. A light flux of the scanning is polarized by a reflection mirror so that the light flux is collected on a bus of the drum 2 using an fθ lens for exposure. By this, an electrostatic latent image of an image pattern corresponding to the image signal is formed on the surface of the drum 2.

The developing device 5 is a developing unit (a developing section) which forms (develops) an unfixed toner image by a toner (a developing agent) from the electrostatic latent image formed on the surface of the drum 2.

The primary transfer roller 6 is a primary transfer unit (a transfer section) which transfers the toner image formed on the drum 2 to the intermediate transfer belt 8 serving as an intermediate transfer body. The primary transfer roller 6 is in contact with the drum 2 by certain pressing force. The primary transfer rollers 6 of the units UY, UM, UC, and UK successively transfer toner images of yellow, magenta, cyan, and black formed on the drums 2 on the intermediate transfer belt 8.

The cleaning device is a cleaning unit which cleans the surface of the drum 2 by removing residual, such as a transfer residual toner, remaining on the drum 2 after the transfer to the intermediate transfer belt 8.

The sheet feeding mechanism 16 is a sheet feeding unit (a supplying unit) which feeds the sheet P accommodated in a cassette to a transfer nip portion T formed by the secondary transfer roller 15 and the counter roller 14. The sheet feeding mechanism 16 of this embodiment includes first and second cassettes in two stages vertically arranged, for example. Each of the cassettes accommodates a plurality of sheets P in a state in which the sheets P are stacked in a direction parallel to a sheet conveying direction using a size restriction plate (a side guide plate). The different cassettes accommodate different sizes of sheets P. The secondary transfer roller 15 transfers the toner image formed on the intermediate transfer belt 8 on the sheet P fed by the sheet feeding mechanism 16 in the transfer nip portion T.

The toner which is not transferred and therefore remains on the intermediate transfer belt 8 after the transfer is removed by the cleaning device (not illustrated) of the intermediate transfer body. The cleaning device of the intermediate transfer body is disposed between the transfer nip portion T and the primary transfer roller 6 of the unit UY on the most upstream side in a rotation direction of the intermediate transfer belt 8.

When receiving a print job through the operation unit 200, the CPU 100 drives a feeding roller of the sheet feeding mechanism 16 which accommodates sheets of a specified size. By this, the sheets P are fed from one of the cassettes of the sheet feeding mechanism 16 one by one and guided to the diagonal conveying mechanism 18 through the conveying path 17 including the conveying roller. The diagonal conveying mechanism 18 is a mechanism which prevents the sheets P from being diagonally fed.

The sheet P output from the diagonal conveying mechanism 18 is guided to the transfer nip portion T. The unfixed toner image formed on the intermediate transfer belt 8 is transferred on the sheet P in the transfer nip portion T.

The sheet P output from the transfer nip portion T is separated (peeled) from a surface of the intermediate transfer belt 8 and guided to the fixing device 9 through the conveying path 19. The toner image formed on the sheet P by the image forming unit is subjected to a fixing process by the fixing device 9 under heat and pressure (fixed to the sheet P as a fixed image). The sheet P including the image fixed thereon is ejected from the ejection roller pair (an ejection unit) 20 from the sheet ejection tray 21 (out of the apparatus).

<Control Block Diagram>

Figure 11:
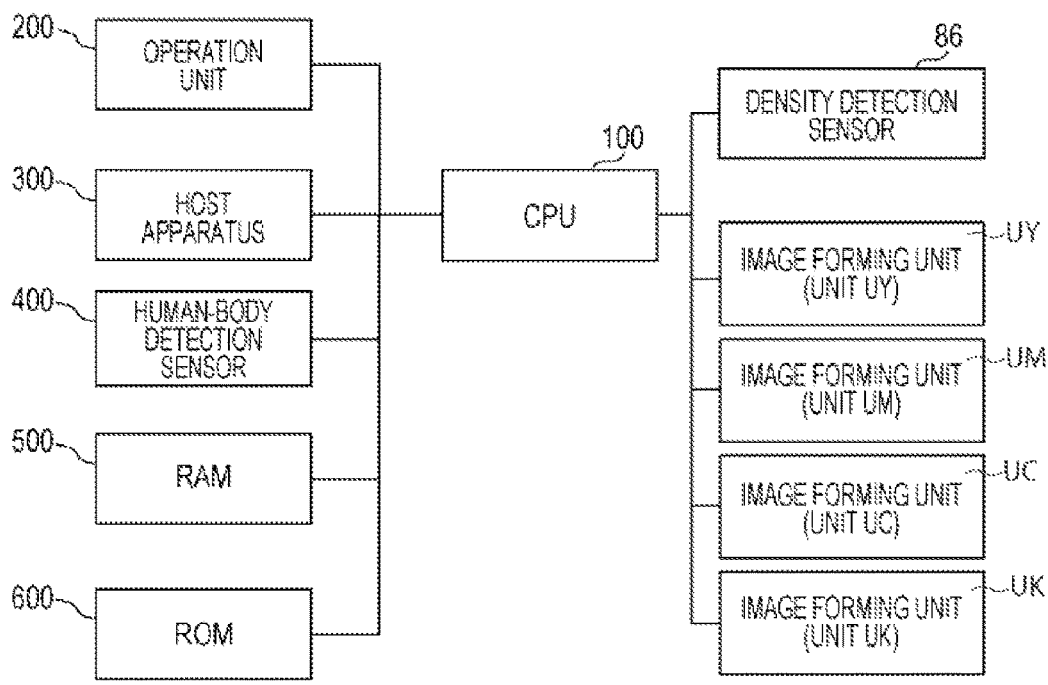
FIG. 11 is a control block diagram.

FIG. 11 is a control block diagram which illustrates a hardware configuration mainly including the CPU 100. The CPU 100 is electrically connected to the operation unit 200, the host apparatus 300, the human-body detection sensor 400, a random-access memory (RAM) 500, a read-only memory (ROM) 600, a density detection sensor 86, and the image forming unit (the units UY, UM, UC, and UK, for example). The CPU 100 serving as a controller controls the components electrically connected to the CPU 100 in accordance with programs stored in the RAM 500. The programs may be stored in the ROM 600.

(2) Human-Body Detection Sensor

The human-body detection sensor 400 will now be described. The human-body detection sensor 400 functions as a human-body detection unit which detects a person near (within a certain region from) the apparatus 1. The human-body detection sensor 400 of this embodiment is a pyroelectric array sensor configured by arranging a plurality of passive type pyroelectric infrared sensors as an array. The passive pyroelectric infrared sensors detect an amount of infrared light emitted from an object having temperature, such as a human body. Since an amount of infrared light is changed if a human body appears in a detection region, the human-body detection sensor 400 may detect the human body (a person) near the apparatus 1. The passive-type pyroelectric infrared light sensor requires small power consumption and has a comparatively large detection region. By arranging the plurality of passive-type pyroelectric infrared sensors as an array, the human-body detection sensor 400 may detect a distance from the apparatus 1 to the human body in accordance with distribution of the infrared amount in the detection region and may detect a movement direction and a movement speed of the human body in accordance with a temporal change of the distribution.

Figure 2:
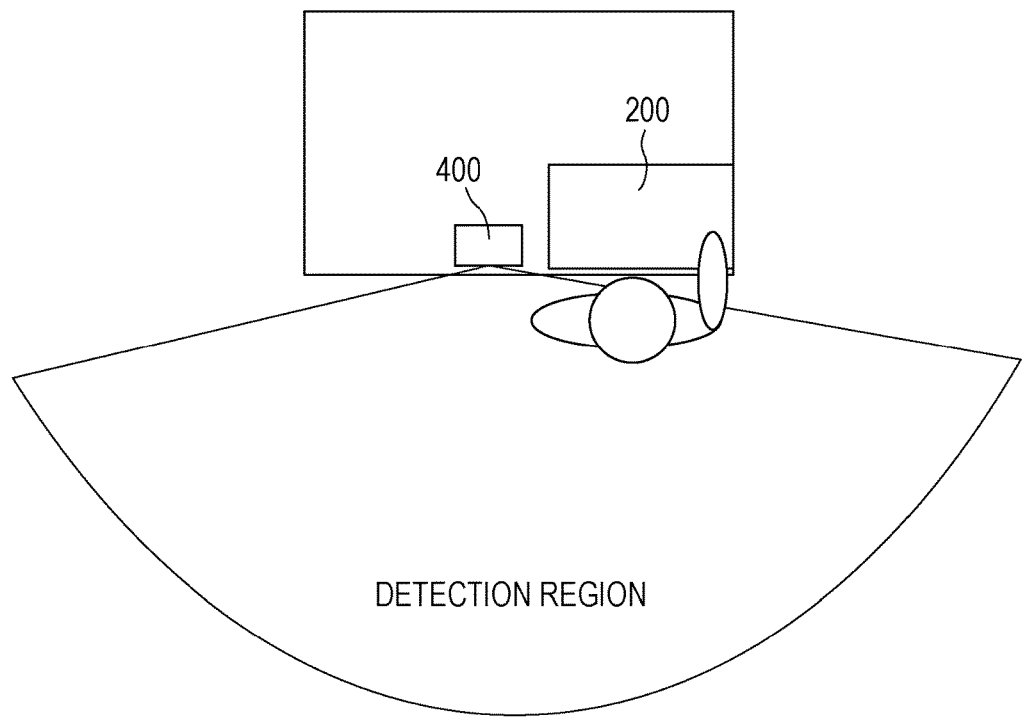
FIG. 2 is a diagram illustrating a detection region of a human-body detection sensor.

FIG. 2 is a diagram illustrating a detection region of a human-body detection sensor, that is, a region in which the human-body detection sensor 400 of this embodiment is capable of detecting infrared light. In FIG. 2, the apparatus 1 viewed from above at a time of installation is schematically illustrated. A region near the apparatus 1 means a certain region including an estimated position where the operator operates the operation unit 200 in front of the apparatus 1 as illustrated in FIG. 2.

Furthermore, a detection method of the human-body detection sensor 400 is not limited to this. For example, an infrared sensor array in which infrared light receiving elements which receive infrared light emitted from a person are arranged in a matrix may be employed. Furthermore, an image recognition type sensor which detects a motion of a person in accordance with a change in images serially taken by a charge-coupled device (CCD) camera or the like may be employed. Furthermore, a reflection type sensor which detects a person in accordance with a change of an amount of reflection light of light (infrared light, for example) emitted from a light source, an ultrasonic type sensor which detects a person by detecting a distance and a direction to an object using ultrasonic waves, or the like may be employed. Although the human-body detection sensor 400 is disposed in the vicinity of the operation unit 200 in this embodiment, the human-body detection sensor 400 may be disposed in another portion in the apparatus 1 as long as detection of access and separation of a human body may be transmitted to the CPU 100.

Furthermore, the human-body detection sensor 400 of this embodiment functions as a trigger of restoration from a sleep mode. The sleep mode is executed by the CPU 100 serving as an execution unit and suppresses power consumption of the operation unit 200 by stopping supply of electric power to the operation unit 200. For example, the sleep mode is entered in a case where the operation unit 200 is not operated for a predetermined period of time. In the sleep mode, the human-body detection sensor 400 and the CPU 100 serving as the execution unit are activated. In the sleep mode, when the human-body detection sensor 400 detects a human body near the apparatus 1, the CPU 100 executes a process of activating the operation unit 200. When the operation unit 200 is activated, the operation unit 200 is available for accepting a user's operation. By this, the process of activating the operation unit 200 may be started before the user touches and operates the apparatus 1 and usability may be improved. Note that a plurality of human-body detection sensors 400 may be provided.

(3) Postponement of Adjustment Process

The apparatus 1 includes the human-body detection sensor 400. In a case where no one is in the certain region near the apparatus 1 at an end of an image forming process and a certain condition is satisfied, the apparatus 1 enters a standby state after executing the adjustment process. On the other hand, in a case where a person is in the certain region near the apparatus 1 at the end of the image forming process, the apparatus 1 postpones the adjustment process and temporarily enters the standby state even if the certain condition is satisfied. Hereinafter, this operation will be described in detail.

Here, the standby state means a waiting state in which the apparatus 1 waits for a next print job (an image forming instruction), that is, a state in which the apparatus 1 may start the image forming process in response to a received print job.

Furthermore, the certain condition means a condition, for example, in which the number of printed sheets after a preceding adjustment process is equal to or larger than the predetermined number of sheets (500 or more, for example).

Furthermore, the end of the image forming process means an end of printing on the last sheet P of the print job accepted by the CPU 100. In a case where a plurality of print jobs have been accepted, the end of the image forming process means an end of printing of the last sheet P of the last one of the plurality of print jobs which have been accepted (reserved jobs). Specifically, a next print job has not been input at the end of the image forming process. The adjustment process will be described in detail later.

The adjustment process is postponed to address the following problems in this embodiment. The adjustment process is executed by interrupting the image forming process, a period of time required for completing the image forming process is increased by a period of time required for the adjustment process, and therefore, productivity may be deteriorated. Therefore, it is preferable that the adjustment process is not frequently executed by interrupting the image forming process but is executed after the image forming process is terminated. Therefore, according to general image forming apparatuses, assuming that an effect is obtained if the adjustment process is performed every 1000 sheets, the adjustment process is performed early at the end of the image forming process when the number of printed sheets becomes equal to or larger than 500 at the end of the image forming process.

However, in a case where the adjustment process is performed every time the image forming process is terminated on the assumption that the certain condition is satisfied (for example, a condition in which the number of printed sheets is 500 or more), a problem arises in the following case. That is, a problem arises in a case where the image forming process performed on a reserved job is terminated in the apparatus before a user who is near the apparatus and who desires to start a next image forming process (for 100 copies, for example) inputs a print job (an image forming instruction). In a case where the certain condition is satisfied when execution of the reserved job is terminated, the apparatus performs the adjustment process, and therefore, a next image forming process (a print process desired by the user) is not started until the adjustment process is terminated. Consequently, a waiting time before the user obtains a first output object may be increased.

On the other hand, in a case the certain condition is satisfied at the end of the image forming process, if the adjustment process is postponed since a person is near the apparatus at the end of the image forming process, image quality may be deteriorated. This occurs in a case where a person who does not desire to use the apparatus is near the apparatus at the end of the image forming process. In a case where the adjustment process is postponed while any person including a person who does not desire to use the apparatus is near the apparatus, another user may input a print job sometime after the end of the image forming process in a state in which the adjustment process is postponed. In this case, the print job of the other user may be executed without executing the adjustment process to be executed at the end of the preceding image forming process. Furthermore, in a case where a person stays near the apparatus for a long period of time, the postponement of the adjustment process is continued due to the existence of the person near the apparatus even if the image forming process issued by the other user is started, and accordingly, image quality may be degraded. Accordingly, it is preferable that, in a case where the person positioned near the apparatus at the end of the image forming process does not desire to use the apparatus, the adjustment process is performed when the image forming process is terminated.

Therefore, in the case where a person is positioned near the apparatus 1 of this embodiment at the end of the image forming process, the apparatus 1 postpones the adjustment process even when the certain condition is satisfied and temporarily enters a standby state (a waiting state in which the apparatus 1 waits for a next image forming instruction). In a case where the apparatus 1 receives a next print job within a certain period of time in the standby state in which the adjustment process is postponed, the apparatus 1 executes the print job in the state in which the adjustment process is postponed. On the other hand, in a case where the certain period of time elapses without receiving a next print job in the standby state in which the adjustment process is postponed, the apparatus 1 executes the postponed adjustment process.

(4) Postponement of Density Adjustment Control

In this embodiment, density adjustment control will be described as the postponed adjustment process. In the density adjustment control, an image forming condition of the image forming unit is determined.

<Outline of Density Adjustment Control>

Figure 3:
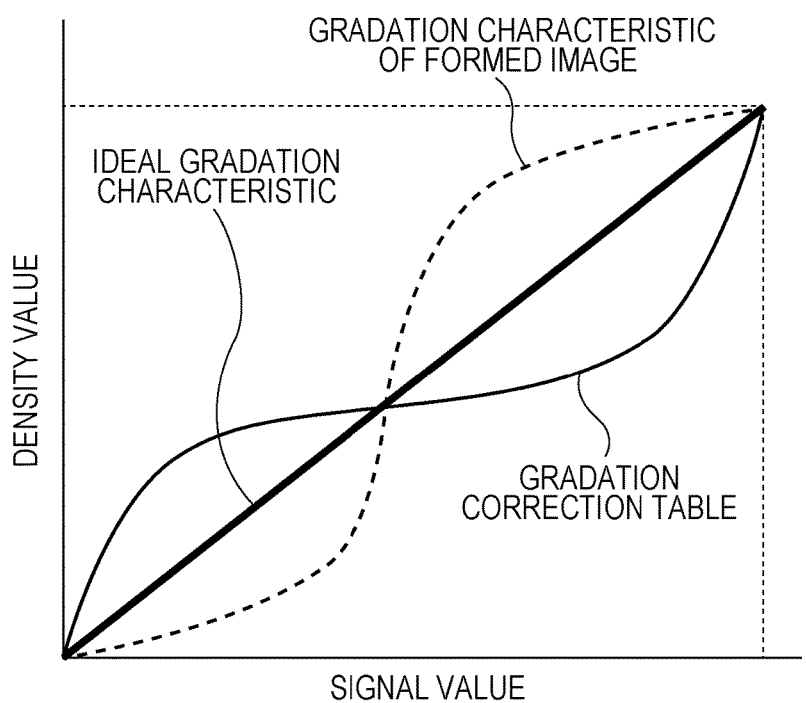
FIG. 3 is a concept diagram illustrating gradation correction.

The apparatus 1 performs gradation correction control so as to form an image corresponding to an input original image with appropriate density. FIG. 3 is a concept diagram illustrating gradation correction and represents the correspondence between a signal value and a density value. It is assumed that a gradation characteristic of an image formed by the apparatus 1 is denoted by a dotted line (a curved line indicated by a dotted line in FIG. 3) relative to an ideal gradation characteristic (a straight line in FIG. 3). A gradation correction table (a curved line indicated by a solid line in FIG. 3) corrects the gradation characteristic denoted by the dotted line (the curved line of the dotted line in FIG. 3) so that the ideal gradation characteristic (the straight line in FIG. 3) is obtained. The gradation correction table is stored in the RAM 500 (FIG. 11). Image information input to the apparatus 1 is converted by the CPU (a conversion unit) 100 in accordance with the gradation correction table. The image forming unit (the units UY, UM, UC, and UK, for example) forms an image using output values (output data) converted in accordance with the gradation correction table.

In the density adjustment control, the CPU 100 determines the gradation correction table to be used for the image formation in accordance with different patch images having different density levels formed by the units UY, UM, UC, and UK.

Specifically, the CPU 100 causes the units UY, UM, UC, and UK to form the different patch images of different density levels and measures the density levels of the patch images on the intermediate transfer belt 8 in accordance with an output of a density detection sensor 86 functioning as a density detection unit. Image data used to form the patch images is stored in the RAM 500 in advance. Note that the patch images may be measured on the intermediate transfer belt 8 and may be measured on the drums 2 (the photoreceptors) of the units UY, UM, UC, and UK or formed and measured on the sheet P. The CPU 100 serving as a determination unit determines the gradation correction table to be used for the image formation in accordance with the measured density levels.

Here, the gradation correction table may be generated by the CPU 100 based on the different patch images or may be generated by modifying (correcting) a tentative gradation correction table which has been generated so that the gradation correction table to be used for the image formation is obtained. In the latter case, the CPU 100 functioning as the determination unit also functions as a correction unit. Furthermore, the tentative gradation correction table is stored in the RAM 500. The determined gradation correction table is stored in the RAM 500. The CPU 100 controls the units UY, UM, UC, and UK in accordance with an output value converted in accordance with the gradation correction table in the print operation (the image forming process). For example, the CPU 100 controls exposure times of the exposure devices 4 of the units UY, UM, UC, and UK.

<Density Adjustment Control of this Embodiment>

Figure 4:
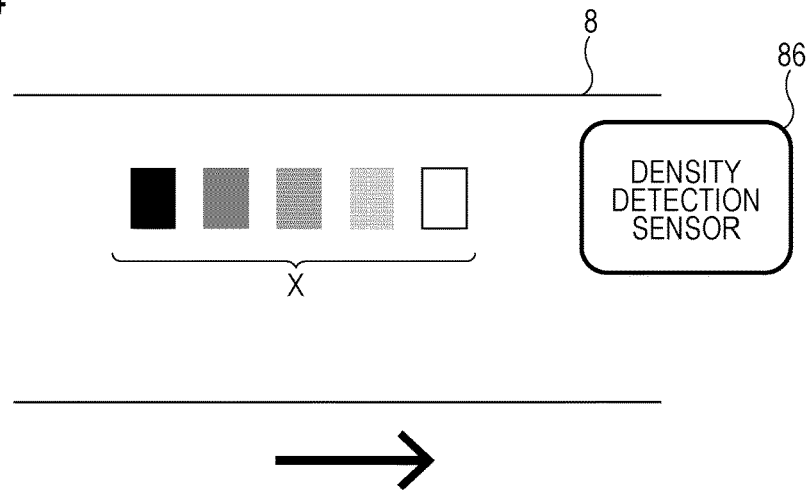
FIG. 4 is a diagram schematically illustrating patch images.

In this embodiment, the CPU 100 controls the units UY, UM, UC, and UK, forms different patch images of different density levels on the drums 2, and transfers the patch images on the intermediate transfer belt 8. The density detection sensor 86 disposed in a position facing to an outer periphery of the intermediate transfer belt 8 detects the density levels of the patch images. The CPU 100 determines the gradation correction table to be used for the image formation in accordance with the density levels. FIG. 4 is a diagram schematically illustrating the patch images. In FIG. 4, a state in which pattern images (denoted by "X" in the drawing) having different density levels are formed on the intermediate transfer belt 8 for one toner (magenta, for example) is illustrated.

<Timing of Execution of Density Adjustment Control>

To obtain a sufficient effect of the density adjustment control, an integration counter which counts the number of sheets P printed after preceding density adjustment control is provided so that the density adjustment control is performed in accordance with a count value of the integration counter. A certain region of the RAM 500 functions as the integration counter and the CPU 100 performs counting. Here, the number of printed sheets is referenced since density of output objects may be changed due to a change of a toner charging amount generated when the image forming process is executed.

In this embodiment, the density adjustment control is performed under a condition (the certain condition) that a value of the integration counter is 500 or more (that is, the number of printed sheets is 500 or more) at the end of the image forming process. Note that a change of the density of the output object at a time when a value of the integration counter is 500 is preferably corrected by the density adjustment control, but the change is difficult to be visibly recognized by the user. When the density adjustment control is executed, the CPU 100 resets the value of the integration counter and counts the number of printed sheets P until next density adjustment control is executed. However, in the case where a person is positioned near the apparatus 1 at the end of the image forming process, the density adjustment control is postponed as described above.

Furthermore, in the image forming process, the density adjustment control is performed by interrupting the image forming process every time the value of the integration counter reaches 1000. When the value of the integration counter becomes larger than 1000, accuracy of the gradation correction is degraded and a density change of an output object may be visibly recognized by the user in some cases. Therefore, the density adjustment control is executed so as to suppress deterioration of image quality even in a case where the image forming process is continuously performed without interruption or in a case where the adjustment process is postponed. Accordingly, the number of sheets larger than the predetermined condition for execution of the adjustment process at the end of the image forming process is set as the number of sheets which is a reference for execution of the adjustment process interrupting the image forming process. After the density adjustment control is executed, the CPU 100 resets the integration counter and counts the number of printed sheets P until next density adjustment control is executed.

Note that values illustrated in this embodiment including a value of the number of sheets (such as 500 and 1000 of the integration counter) serving as the predetermined condition is merely an example, and the values are not limited to this.

<Control from Time Immediately after End of Image Forming Process to Time when Next Image Forming Process is Started>

Figure 5:
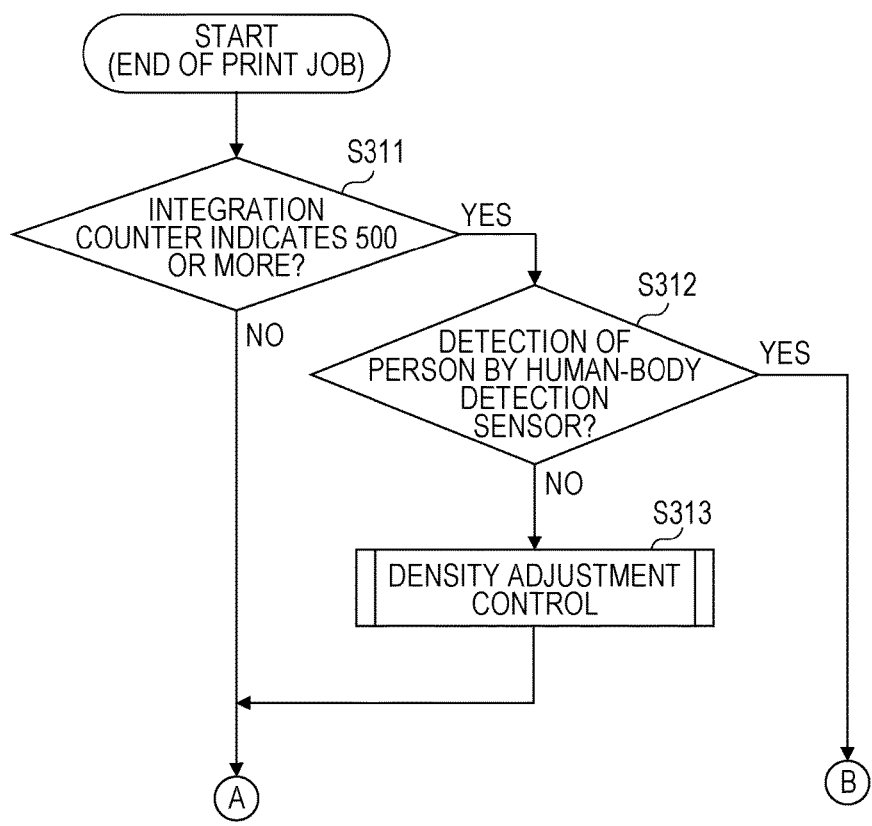
FIG. 5 is a flowchart illustrating a sequence immediately after an image forming process is terminated.
Figure 6:
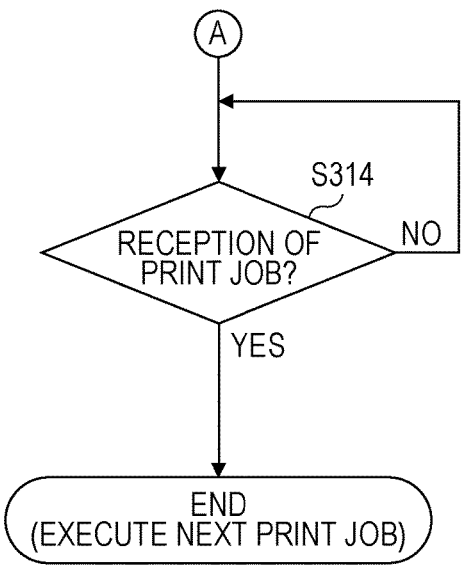
FIG. 6 is a flowchart illustrating the sequence immediately after the image forming process is terminated (continued).
Figure 7:
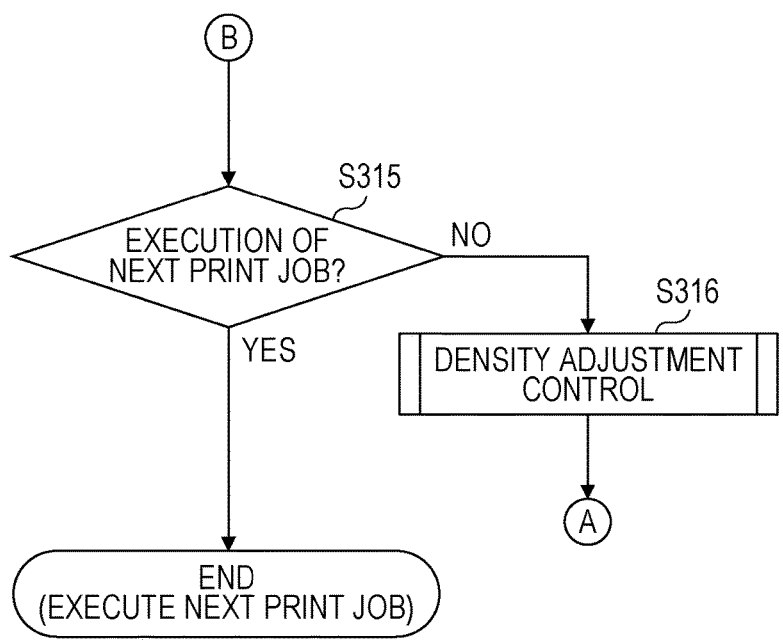
FIG. 7 is a flowchart illustrating the sequence immediately after the image forming process is terminated (continued).

FIG. 5 is a flowchart illustrating a sequence immediately after the image forming process is terminated. FIGS. 6 and 7 are flowcharts illustrating the sequence immediately after the image forming process is terminated (continued). In FIGS. 5 to 7, a process to be performed after the image forming process is terminated and before start of a next image forming process is illustrated.

Control illustrated in the flowcharts is executed when the CPU 100 serving as the controller executes a program stored in the RAM 500. As with the case of FIG. 5, control of flowcharts illustrated in this embodiment and other embodiments is executed when the CPU 100 serving as the controller executes programs stored in the RAM 500.

The end of the image forming process means an end of the last printing of a print job accepted by the CPU 100 (a reserved job).

Specifically, the end of the image forming process in this embodiment corresponds to a timing when the ejection roller pair 20 serving as an ejection unit ejects the last sheet P of the reserved job to the sheet ejection tray 21 (out of the apparatus). Specifically, a sensor (not illustrated) which detects pass of the sheet P may be disposed immediately after the ejection roller pair 20 so that the CPU 100 measures a timing of pass of the last sheet P in accordance with an output of the sensor.

Note that a method for measuring the timing when the last sheet P of the reserved job has passed the ejection roller pair 20 is not limited to this. For example, the CPU 100 may predict the timing when the last sheet P passes the ejection roller pair 20. In this case, the CPU 100 calculates the timing in accordance with a timing when the sheet feeding mechanism 16 supplies the last sheet P of the reserved job, an output of the sensor which detects the pass of the sheet P on an upstream side in a conveying direction of the sheet P, or the like and a process speed of the apparatus 1.

Although the last sheet P of the reserved job passes the ejection roller pair 20 at the end of the image forming process in this embodiment, the timing of the end of the image forming process is not limited to this. Specifically, the timing is included in a period of time from "a moment when the exposure device 4 of the forming unit on the most upstream side (the unit UY in this embodiment) exposes a trailing end of the last image of the print job" to "a moment when the last sheet P of the print job is ejected out of the apparatus 1 (to the sheet ejection tray 21 in this embodiment)". A certain timing included in the period of time is set as the end of the image forming process in advance.

The forming unit on the most upstream side is one of the four units UY, UM, UC, and UK which is disposed on the most upstream side when the transfer nip portion T is set as a most downstream side in the rotation direction of the intermediate transfer belt 8. The CPU 100 obtains a result of detection by the human-body detection sensor 400 while the timing set in advance is determined as the end of the image forming process. In a case where the density adjustment control is to be executed as the adjustment process only after formation of an electrostatic latent image corresponding to the last image data of the print job is terminated, for example, formation of the patch images may be started on the drums 2.

Hereinafter, a flow will be described. When the print job is terminated (that is, when the image forming process is terminated), the CPU 100 determines whether the value of the integration counter which counts the number of printed sheets is 500 or more (S311). Specifically, the CPU 100 determines whether a predetermined condition is satisfied.

When the number of printed sheets is smaller than 500, the predetermined condition is not satisfied, and therefore, the CPU 100 proceeds to step S314 (FIG. 6) without executing the density adjustment control and waits for a next print job (an image forming instruction). Specifically, the CPU 100 enters a standby state in step S314. Here, the standby state means a waiting state in which the apparatus 1 waits for a next image forming instruction as described above, that is, a state in which the apparatus 1 may start the image forming process in response to an image forming instruction received by the apparatus 1. The CPU 100 executes a next print job when the operation unit 200 receives the next print job (an image forming instruction) (Yes in step S314). That is, the CPU 100 starts a next image forming process. Note that, in a case where the apparatus 1 is capable of receiving a print job (an image forming instruction) from the host apparatus 300, the CPU 100 executes a next print job (Yes in step S314) when receiving the next print job from the host apparatus 300 in step S314.

The human-body detection sensor 400 determines whether a human body exists near the apparatus 1 at the end of the image forming process. The CPU 100 obtains a result of the determination of the human-body detection sensor 400 at the end of the image forming process. When the value of the integration counter is 500 or more in step S311, the CPU 100 determines whether the human-body detection sensor 400 has detected a human body near the apparatus 1 (the certain region) at the end of the image forming process (S312).

Note that, although at least the result of the determination of the human-body detection sensor 400 at the end of the image forming process is determined as a determination reference, a timing of the determination reference is not limited to a moment. For example, in a case where a timing when the last sheet P passes the sensor disposed immediately after the ejection roller pair 20 is set as the end of the image forming process, the following determination may be performed. That is, a case where the human-body detection sensor 400 detects a person for a predetermined period of time (for one or two seconds, for example) including a moment when the sensor reacts the pass of the sheet P is determined that a person exists near the apparatus 1 at the end of the image forming process.

When determining that the human-body detection sensor 400 has not detected a human body near the apparatus 1 at the end of the image forming process (No in step S312), the CPU 100 performs the density adjustment control described below (S313), and thereafter, the process proceeds to step S314 (FIG. 6). The CPU 100 executes a next image forming process when the operation unit 200 receives a next print job (an image forming instruction) (Yes in step S314).

On the other hand, when the human-body detection sensor 400 detects a human body near the apparatus 1 at the end of the image forming process (Yes in step S312), the CPU 100 does not execute the density adjustment control even in a case where the value of the integration counter is 500 or more and proceeds to step S315 (FIG. 7).

In step S315 (FIG. 7), the CPU 100 determines whether a next print job is to be executed. When a next print job is received through the operation unit 200 within 30 seconds (within a predetermined period of time) after the image forming process is terminated, the CPU 100 determines that the next print job is to be executed. On the other hand, when a next print job is not received through the operation unit 200 within 30 seconds (within the predetermined period of time) after the image forming process is terminated, the CPU 100 determined that a next print job is not to be executed. Specifically, in a case where the certain condition is satisfied (Yes in step S311) when the human-body detection sensor 400 detects a human body at the end of the image forming process (Yes in step S312), the density adjustment control is not immediately executed and the CPU 100 waits for a certain period of time (that is, temporarily enters a standby state). Here, the certain period of time is counted in the RAM 500 by the CPU 100 functioning as a timer. Furthermore, a value set as the certain period of time is stored in the RAM 500 in advance.

When determining that a next print job is to be executed in step S315, the CPU 100 starts a received print job (that is, starts an image forming process). A sequence in the image forming process will be described later with reference to FIG. 9.

On the other hand, when determining that a next print job is not to be executed in step S315, the CPU 100 executes the density adjustment control (S316), and thereafter, proceeds to step S314 (FIG. 6). The CPU 100 starts a next image forming process when the operation unit 200 receives a next print job (an image forming instruction) (Yes in step S314).

According to FIGS. 5 to 7, the CPU 100 starts the image forming process before executing the density adjustment control in the following case: a case where the certain condition is satisfied at the end of the image forming process (Yes in step S311), the human-body detection sensor 400 detects a human body at the end of the image forming process (Yes in step S312), and the print job is executed (Yes in step S315). Accordingly, in a case where a person who desires to start the image forming process exists near the apparatus 1 at the end of the image forming process, the density adjustment control may be postponed and the image forming process may be started. Consequently, a waiting time for the user before a next image forming process is started may be reduced.

According to FIGS. 5 to 7, the process in step S316 is executed in a case where the certain condition is satisfied at the end of the image forming process (Yes in step S311), the human-body detection sensor 400 detects a human body at the end of the image forming process (Yes in step S312), and the print job is not executed (No in step S315). Accordingly, in a case where a person who does not desire to start the image forming process exists near the apparatus 1 at the end of the image forming process, the density adjustment control which is postponed at the end of the image forming process may be executed before a next image forming process is started. Consequently, deterioration of image quality may be suppressed in execution of a print job issued by the next user. Furthermore, an image forming process executed by the next user is prevented from being interrupted by the density adjustment control, and a waiting time until the image forming process is terminated may be reduced.

Note that, in step S315, a reference of a determination as to whether a next print job is to be executed is not limited to an elapsed time after the end of the image forming process, and may be an elapsed time after a start or an end of the determination in step S312.

Furthermore, the value of the certain period of time described above is merely an example, and the value is not limited to this.

As a modification of the determination step in step S315, a negative result may be obtained in step S315 when the human-body detection sensor 400 does not detect a human body before the determination as to whether a print job is received within the certain period of time.

Specifically, the CPU 100 determines that a next print job is to be executed (Yes) in step S315 in the following case: a case where the operation unit 200 has received a next print job within the predetermined period of time after the end of the image forming process and the human-body detection sensor 400 continuously detects a human body for a period of time after the end of the image forming process to the reception of the next print job. Accordingly, in a case where a person who desires to start the image forming process exists near the apparatus 1 at the end of the image forming process, the image forming process may be started before the density adjustment control is executed. Consequently, a waiting time for the user before a next image forming process is started may be reduced.

On the other hand, in this modification, the CPU 100 determines that a next print job is not to be executed in step S315 in the following two cases. First, such a determination is made in a case where the operation unit 200 does not receive a next print job within the predetermined period of time after the end of the image forming process and the human-body detection sensor 400 does not detect a human body. Specifically, the process proceeds to step S316 when the human-body detection sensor 400 enters a state in which a human body is not detected from a state in which a human body is detected before the predetermined period of time elapses in a state in which a next print job is not received. Accordingly, in a case where a person who is positioned near the apparatus 1 at the end of the image forming process goes away without starting an image forming process, the density adjustment control which is postponed at the end of the image forming process may be executed before a next image forming process is started. Second, such a determination is performed in a case where the operation unit 200 does not receive a next print job while the human-body detection sensor 400 continuously detects a human body for the predetermined period of time after the end of the image forming process. Specifically, in a state in which the human-body detection sensor 400 detects a human body and a state in which the operation unit 200 does not receive a next print job, if the predetermined period of time has elapsed, the process proceeds to step S316. Accordingly, in a case where a person who does not desire to start an image forming process exists near the apparatus 1 at the end of the image forming process, the density adjustment control which is postponed at the end of the image forming process may be executed before a next image forming process is started.

Furthermore, in a case where the apparatus 1 is capable of receiving a print job (an image forming instruction) from the host apparatus 300, a positive result may be obtained in step S315 when the CPU 100 receives a print job from the host apparatus 300 within a predetermined period of time.

<Density Adjustment Control>

Figure 8:
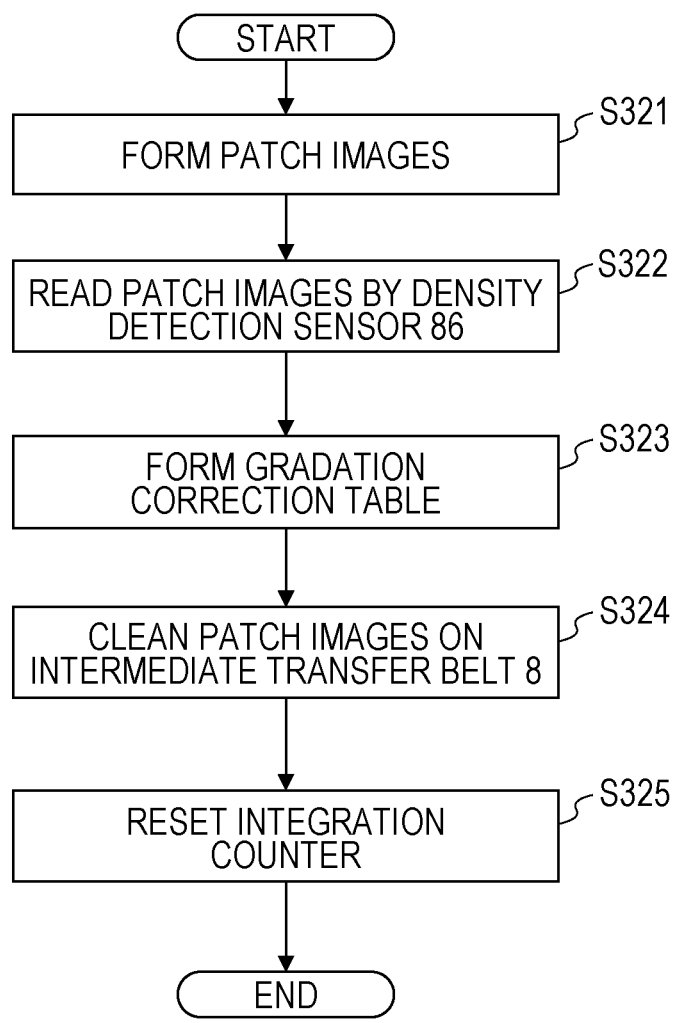
FIG. 8 is a flowchart illustrating a sequence of density adjustment control.

The density adjustment control executed in step S313 of FIG. 5 and step S316 of FIG. 7 will be described with reference to FIG. 8. FIG. 8 is a flowchart illustrating a sequence of the density adjustment control.

In the density adjustment control of this embodiment, 40 patch images (10 patches for each of the colors, that is, yellow, magenta, cyan, and black) are read by the density detection sensor 86. By this, a high-accuracy gradation correction table may be determined, and therefore, high-accuracy feedback may be performed for the image forming unit. On the other hand, a large number of patch images are formed on the intermediate transfer belt 8 and toner on the intermediate transfer belt 8 is required to be cleaned by the intermediate transfer belt cleaning device (not illustrated), and therefore, approximately 30 seconds is required for execution of the density adjustment control.

When the density adjustment control is started, the CPU 100 controls the units UY, UM, UC, and UK so that the patch images of 10 gradations are formed on the intermediate transfer belt 8 (S321). Subsequently, the CPU 100 reads the patch images by the density detection sensor 86 and measures density levels (S322). The CPU 100 determines a gradation correction table to be used for image formation in accordance with a result of the detection by the density detection sensor 86 (S323). The CPU 100 operates the cleaning device (not illustrated) and cleans the patch images on the intermediate transfer belt 8 which have been read by the density detection sensor 86 (S324). The CPU 100 resets the integration counter (S325) and terminates the density adjustment control.

<Control in Image Forming Process>

Figure 9:
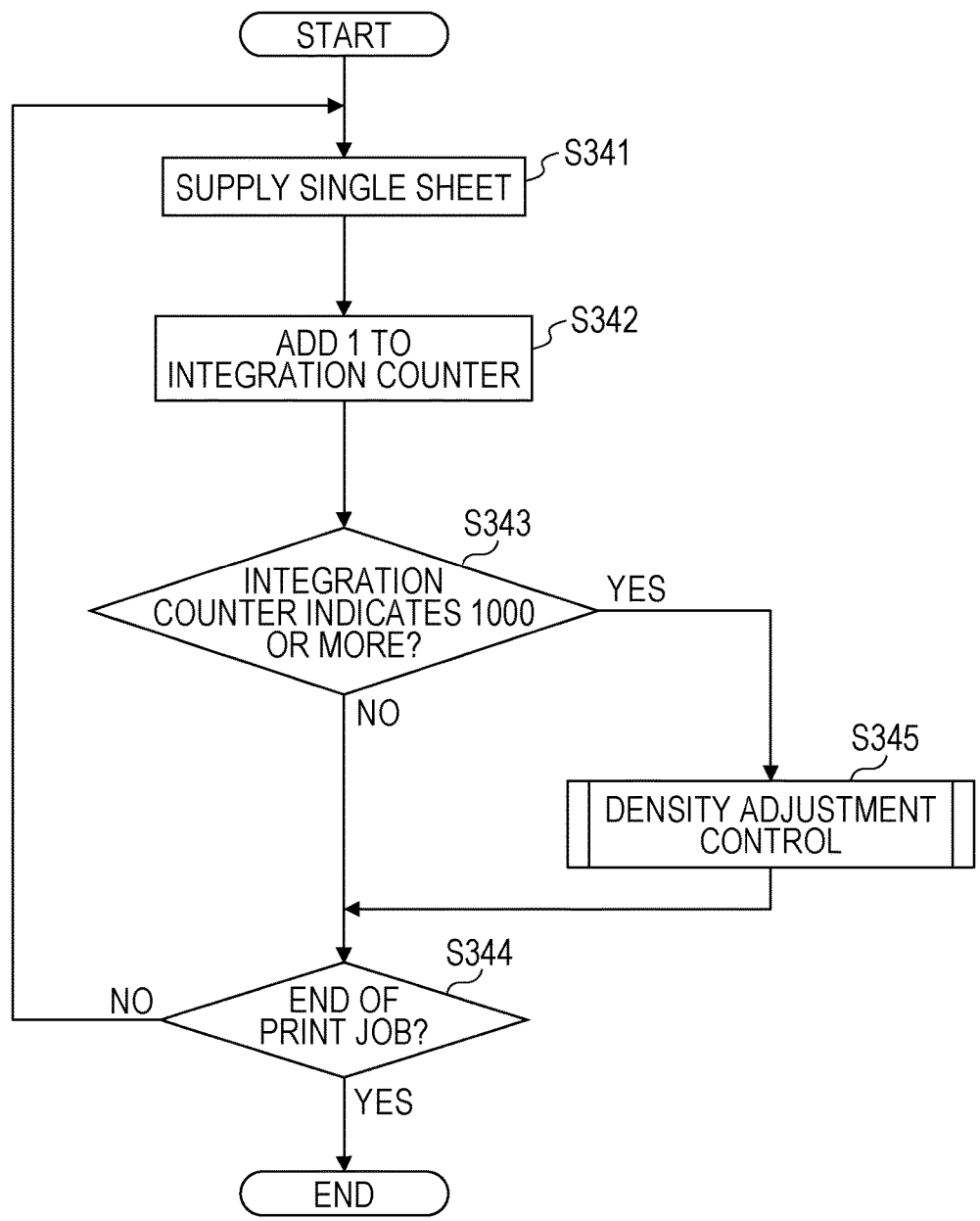
FIG. 9 is a flowchart illustrating a sequence of the image forming process.

Next, control of execution of a print job will be described with reference to FIG. 9. FIG. 9 is a flowchart illustrating a sequence of the image forming process.

While the print job is processed, the density adjustment control is performed by interrupting the print job every time the value of the integration counter reaches 1000.

When execution of the print job is started, every time a printing operation is performed on one sheet (S341), the integration counter is incremented by one (S342). The increment may be performed every time the sheet feeding mechanism 16 feeds one sheet or when the CPU 100 transmits an image forming signal corresponding to a next sheet P to the exposure devices 4 of the units UY, UM, UC, and UK. Furthermore, the increment may be performed every time the sheet P passes the sensor on the conveying path.

In step S343, the CPU 100 determines whether the value of the integration counter is 1000 or more.

When the value of the integration counter is smaller than 1000, the CPU 100 determines whether the print job is terminated (S344). When the CPU 100 terminates the received print job, the image forming process is terminated. When the print job is not terminated, the process returns to step S341 and the print job is continued until the CPU 100 terminates the received print job.

The CPU 100 performs the density adjustment control described above (FIG. 8) (S345) when the value of the integration counter is 1000 or more. By this, even in a case where the image forming process is not terminated but continuously performed or a case where the adjustment process is postponed, deterioration of image quality may be suppressed. When the density adjustment control is executed, the value of the integration counter is reset (S325 of FIG. 8). When the CPU 100 terminates the received print job, the image forming process is terminated whereas when the CPU 100 does not terminate the print job, the process returns to step S341 and the print job is continuously performed until the CPU 100 terminates the received print job (S344).

When the print job is terminated, the sequence immediately after the end of the image forming process (FIGS. 5 to 7) is performed.

Second Embodiment

In the first embodiment, in the case where the certain condition is satisfied at the end of the image forming process and the human-body detection sensor 400 detects a person at the end of the image forming process, the density adjustment control may be postponed and a next print job may be started without performing the density adjustment control (Yes in step S315 of FIG. 7).

In a second embodiment, in a case where a certain condition is satisfied at an end of an image forming process, a CPU 100 changes content of execution of an adjustment process in accordance with a result of a determination as to whether a human-body detection sensor 400 has detected a person at the end of the image forming process. Specifically, in a case where the certain condition is satisfied at the end of the image forming process and the human-body detection sensor 400 detects a person at the end of the image forming process, although density adjustment control is postponed, simple density adjustment control which is simplified normal density adjustment control is executed before a next print job is started. The simple density adjustment control requires a shorter period of time when compared with the normal density adjustment control.

Hereinafter, a configuration of the second embodiment will be described in detail while a difference between the first and second embodiments is mainly described. Note that reference numerals the same as those of the first embodiment are assigned to components the same as those of the first embodiment, and redundant descriptions are omitted.

Note that, in the description of this embodiment, the "simple density adjustment control" and the "(normal) density adjustment control" are discriminated from each other. The "(normal) density adjustment control" in this embodiment corresponds to the density adjustment control of the first embodiment.

<Simple Density Adjustment Control>

In the simple density adjustment control, the number of patch images to be formed is reduced when compared with the normal density adjustment control, and a gradation correction table is determined in accordance with a result of density detection of the smaller number of patch images.

For example, a tentative gradation correction table which has been generated in advance is modified so that a gradation correction table to be used for image formation is obtained. Here, the tentative gradation correction table is stored in the RAM 500. Although 10 different patch images of different density levels are generated for each color in the normal density adjustment control, 3 different patch images of different density levels are generated for each color in the simple density adjustment control. Data of the patch images to be used in the simple density adjustment control is stored in the RAM 500 in advance. Since a smaller number of patch images are generated, a period of time required for generating patch images is reduced, and therefore, approximately 30 seconds which is required for the normal density adjustment control may be reduced to approximately 15 seconds which is required for the simple density adjustment control.

A flow of a concrete sequence is the same as that of the normal density adjustment control except for two points described below, and a description will be made with reference to FIG. 8. Furthermore, descriptions of the same portions are omitted.

First, the simple density adjustment control is different from the normal density adjustment control in the number of patches to be formed as described above. Specifically, the number of patches generated in step S321 of FIG. 8 is smaller than that of the normal density adjustment control.

Second, the simple density adjustment control is different from the normal density adjustment control in that resetting of an integration counter in step S325 (FIG. 8) is not performed. Specifically, the process in step S325 of FIG. 8 is not executed. Accordingly, in a case where a print job is executed after the simple density adjustment control is performed (Yes in step S315 of FIG. 7), the normal density adjustment control which has been postponed may be inserted when a value of the integration counter becomes equal to a second number (1000) during the print job similarly to the first embodiment. Even in a case where the image forming process is not terminated but continuously performed or a case where the adjustment process is postponed, deterioration of image quality may be suppressed.

<Control from Time Immediately after End of Image Forming Process to Time when Next Image Forming Process is Started>

Figure 10:
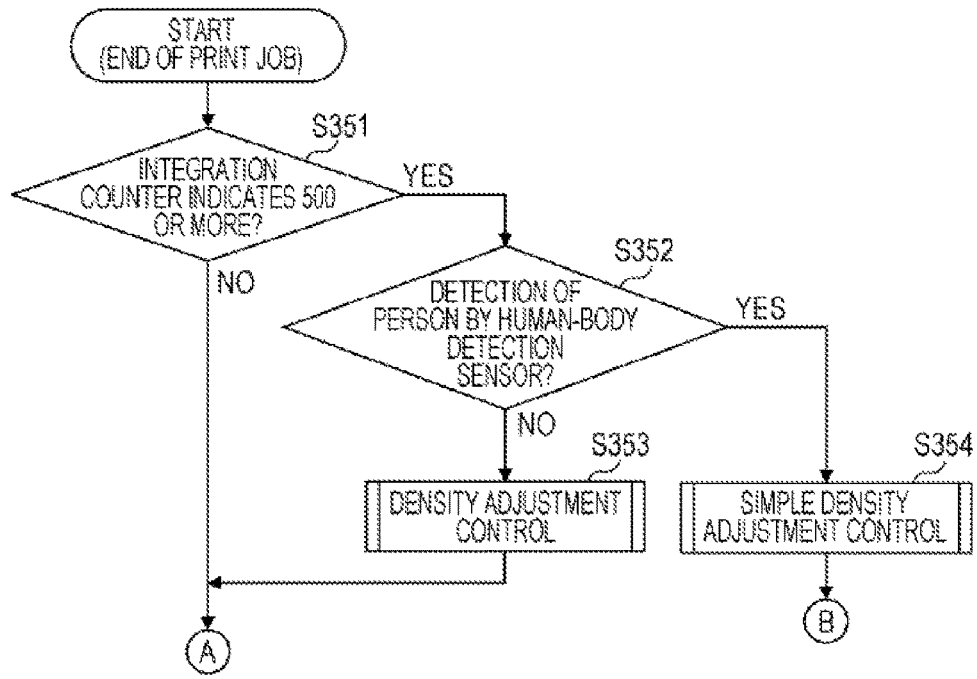
FIG. 10 is a flowchart illustrating a sequence immediately after an image forming process is terminated.

A process to be performed after an end of the image forming process of this embodiment and before start of a next image forming process will be described with reference to FIGS. 10, 6, and 7. FIG. 10 is a flowchart illustrating a sequence immediately after the image forming process is terminated. A continued flow after the flow of FIG. 10 corresponds to those of FIGS. 6 and 7 of the first embodiment. Note that detailed descriptions of configurations the same as those of the first embodiment are omitted.

When the print job is terminated (that is, the image forming process is terminated), the CPU 100 determines whether a value of the integration counter which counts the number of printed sheets is 500 (a predetermined number) or more (S351). Specifically, the CPU 100 determines whether a certain condition is satisfied.

When the value is smaller than 500, the certain condition is not satisfied, and therefore, the CPU 100 proceeds to step S314 (FIG. 6) without executing the normal density adjustment control and waits for a next print job (an image forming instruction). Specifically, the CPU 100 enters a standby state in step S314. The CPU 100 executes a next print job when the operation unit 200 receives a next print job (an image forming instruction) (Yes in step S314 of FIG. 6). That is, the CPU 100 starts a next image forming process.

In step S352, as with step S312 of FIG. 5, the CPU 100 determines whether the human-body detection sensor 400 has detected a human body at an end of the image forming process.

When determining that the human-body detection sensor 400 has not detect a human body near the apparatus 1 at the end of the image forming process (No in step S352), the CPU 100 performs the normal density adjustment control (S353), and thereafter, the process proceeds to step S314 (FIG. 6). The CPU 100 starts a next image forming process when the operation unit 200 receives a next print job (an image forming instruction) (Yes in step S314).

When determining that the value of the integration counter exceeds 500 (Yes in step S351) and a human body is detected near an apparatus 1 at the end of the image forming process (Yes in step S352), the CPU 100 executes the simple density correction control (S354). A flow of the simple density correction control has been described with reference to FIG. 8. Thereafter, the process proceeds to step S315 (FIG. 7).

The CPU 100 determines whether a next print job is to be executed (S315). Note that, instead of the elapsed time after the end of the image forming process, an elapsed time after preceding simple density adjustment control (S354) is started or an elapsed time after the preceding simple density adjustment control (S354) is completed may be set as a reference of the determination as to whether a next print job is to be executed.

When determining that a next print job is to be executed in step S315, the CPU 100 starts a received print job (that is, starts an image forming process).

The sequence of the image forming process is the same as that of the first embodiment (FIG. 9), and therefore, a description thereof is omitted. When the value of the integration counter reaches the second number (1000) while the print job is processed, the normal density adjustment control which has been postponed is inserted. By this, even in a case where the image forming process is not terminated but continuously performed or a case where the adjustment process is simplified by executing the simple density adjustment control at an end of a preceding image forming process, deterioration of image quality may be suppressed. When the normal density adjustment control is executed, the value of the integration counter is reset (S325 of FIG. 8).

On the other hand, in a case where a print job is not executed after the simple density adjustment control is executed (No in step S315), the CPU 100 performs the normal density adjustment control in step S316. Thereafter, the process proceeds to step S314 (FIG. 6). The CPU 100 starts a next image forming process when the operation unit 200 receives a next print job (an image forming instruction) (Yes in step S314). By this, the simplified adjustment control executed by the simple density adjustment control at the end of the image forming process in a case where a person who does not desire to start an image forming process exists near the apparatus 1 at the end of the image forming process may be complemented. Specifically, the postponed normal density adjustment control may be executed before a next image forming process is started. Consequently, an image forming process executed by the next user is prevented from being interrupted by the normal density adjustment control, and a waiting time until the image forming process is terminated may be reduced.

As described with reference to FIGS. 10, 6, and 7 above, the CPU 100 executes the simple density adjustment control instead of the normal density adjustment control and starts the image forming process before the normal density adjustment control in the following case: a case where the certain condition is satisfied at the end of the image forming process (Yes in step S351), the human-body detection sensor 400 detects a human body at the end of the image forming process (Yes in step S352), and the print job is executed (Yes in step S315). Accordingly, in a case where a person who desires to start the image forming process exists near the apparatus 1 at the end of the image forming process, the simple density adjustment control may be performed for a shorter period of time instead of the normal density adjustment control before the image forming process is started. Consequently, a waiting time for the user before the image forming process is started may be reduced. Since the density adjustment is executed even though the density adjustment is simplified, deterioration of image quality of an output object may be suppressed.

Third Embodiment

The apparatuses 1 according to the first and second embodiments execute the density adjustment control as the postponed adjustment control.

An apparatus 1 of this embodiment executes "a rubbing process (hereinafter referred to as a "refreshing process") of adjusting a surface state of a fixed member" as the postponed adjustment process.

The apparatus 1 of this embodiment is different from those of the first and second embodiments in that an adjustment process is started before a standby state is entered in a case where a person does not exist in a certain region near the apparatus 1 at an end of an image forming process and a certain condition is satisfied. In this case, if a human-body detection sensor 400 detects a person near the apparatus 1 during execution of the adjustment process, the adjustment process being executed is stopped and a standby state is entered.

In the density adjustment control according to the first and second embodiments, toner is consumed when patch images are formed. Furthermore, the density adjustment control is interrupted, an image forming condition may not be determined, and therefore, toner used before the interruption is wasted. Accordingly, it is preferable that once the density adjustment control is started, the density adjustment control is completed without interruption. In this way, consumption of toner due to interruption of the density adjustment control is suppressed. On the other hand, the refreshing process of this embodiment consumes toner with little waste even if the density adjustment control is interrupted, and an effect corresponding to a period of time of the execution before the interruption is obtained.

Note that, in the apparatus 1 of this embodiment, the adjustment process started before entering the standby state may not be interrupted in a case where a person does not exist in the certain region near the apparatus 1 at the end of the image forming process and the certain condition is satisfied.

Hereinafter, a configuration of the third embodiment will be described in detail while a difference between the first and second embodiments is mainly described. Note that reference numerals the same as those of the first embodiment are assigned to components the same as those of the first embodiment, and redundant descriptions are omitted.

(5) Fixing Device

Figure 12:
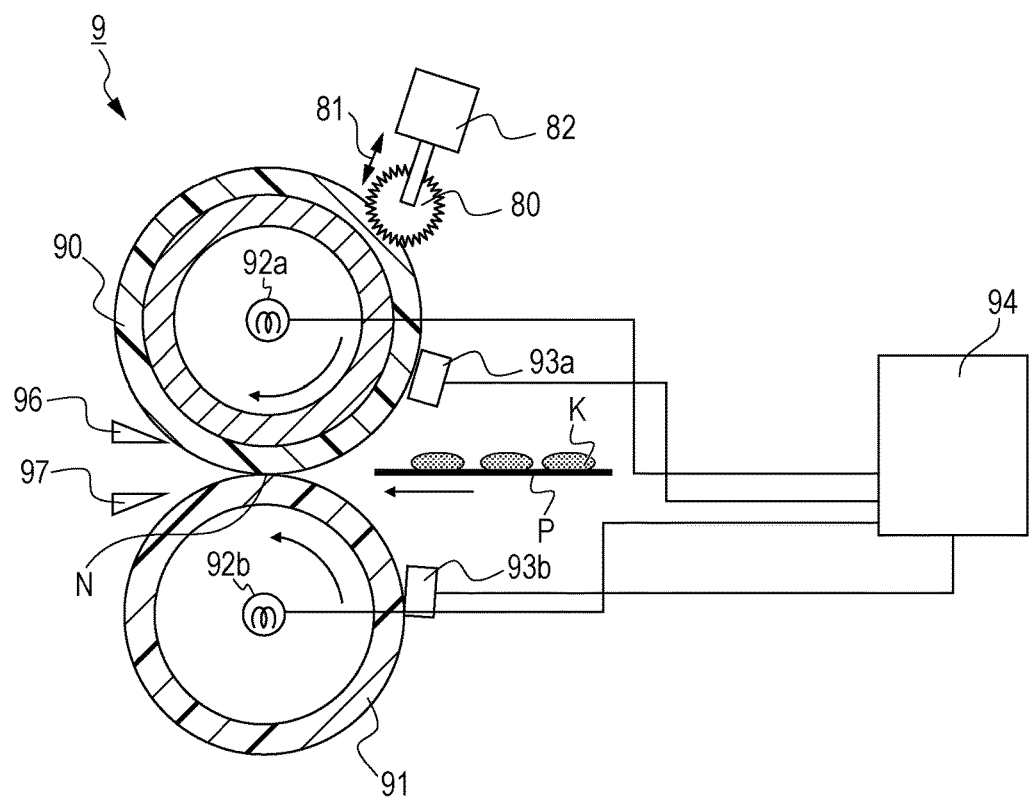
FIG. 12 is a diagram illustrating a configuration of a fixing device.

A configuration of a fixing device (a fixing unit) 9 according to this embodiment will be described. FIG. 12 is a diagram illustrating a configuration of the fixing device. The fixing device 9 of this embodiment executes the refreshing process as the adjustment process, and therefore, includes a rubbing member (a refreshing roller 80) which rubs a fixing member.

The fixing device 9 includes a fixing roller 90 and a pressurizing roller 91 having halogen heaters 92a and 92b, respectively, and separation claws 96 and 97. Here, the fixing device 9 employs a heat roller method. Specifically, the fixing device 9 performs fusing and fixing on a sheet P conveyed to the fixing device 9 and toner K electrostatically held by the sheet P. The fixing device 9 conveys the sheet P in a state in which the sheet P is pinched in a pressure welding portion (a nip portion N) between the rotated fixing roller 90 and the pressurizing roller 91.

The fixing roller 90 has an aluminum (Al) hollow core bar having an outer diameter of 50 millimeter (mm) and a thickness of 12 mm, a silicon (Si) rubber layer having a thickness of approximately 12 mm serving as an intermediate layer formed on the Al hollow core bar, and a fluorine resin, such as polytetrafluoroethylene (PTFE), having a thickness of approximately 20 micrometers ($\mu$m), serving as a surface layer formed on the Si rubber layer. The pressurizing roller 91 has an Al hollow core bar having an outer diameter of 50 mm and a thickness of 12 mm, a silicone rubber layer of 25 $\mu$m formed on the Al hollow core bar, and a perfluoroalkoxy (PFA) tube having a thickness of approximately 50 $\mu$m which covers the silicone rubber layer.

The fixing roller 90 and the pressurizing roller 91 are detachable by pressure and driven by respective driving motors, not illustrated. The halogen heaters 92a and 92b heat, by infrared light, inner sides of the fixing roller 90 and the pressurizing roller 91, respectively. Reference numerals

93a and 93b denote temperature detection elements, such as a thermistor or a thermopile. A temperature control device 94 is a control circuit which controls the halogen heaters 92a and 92b. The temperature control device 94 detects surface temperatures of the fixing roller 90 and the pressurizing roller 91 in accordance with output signals of the temperature detection elements 93a and 93b and performs control such that 160 degrees Celsius (° C.) is maintained on the surface of the fixing roller 90 and 100° C. is maintained on the surface of the pressurizing roller 91 during image formation.

The refreshing roller 80 is a rubbing member which rubs the fixing member. In this embodiment, the refreshing roller 80 rubs the surface of the fixing roller (the fixing member) 90. The refreshing roller 80 is formed by attaching abrasive grains serving as a rubbing member to a steel use stainless (SUS) core bar having an outer diameter of 12 mm through a bonding layer. Various types of abrasive grain which are commercially available or composite of various types of abrasive grains may be bonded in the bonding layer so that the rubbing layer is formed. Examples of the commercially-available abrasive grains include aluminum oxide, aluminum hydroxide oxide, silicon oxide, cerium oxide, titanium oxide, zirconia, lithium silicate, silicon nitride, silicon carbide, ferric oxide, chromic oxide, antimony oxide, and diamond. In this embodiment, alumina (aluminum oxide) system (which is also referred to as "alundum" or "molundum") rubbing member is used. The alumina system is most-widely-used an abrasive grain which has sufficiently high hardness when compared with the fixing roller 90, has a beneficial effect on cutting performance due to sharpness thereof, and is suitable for the rubbing member in this embodiment.

The refreshing roller 80 may be moved in a direction indicated by an arrow mark 81, and may apply pressure on the fixing roller 90 and may be separated from the fixing roller 90 by a separation unit 82 by a predetermined advance amount. When the refreshing roller 80 is pressed by the predetermined advance amount, a rubbing nip is formed between the refreshing roller 80 and the fixing roller 90. Furthermore, the refreshing roller 80 is driven by a driving motor, not illustrated. Although, as a rotation direction, a surface movement direction may be a forward direction or backward direction, surface speeds of the fixing roller 90 and the refreshing roller preferably have a difference in circumferential speed.

(6) Postponement of Refreshing Process

In this embodiment, the refreshing process will be described as an example of a postponed adjustment process. The refreshing process corresponds to an adjustment process performed by the fixing unit.

<Outline of Refreshing Process>

The apparatus 1 performs the refreshing process so as to suppress roughness of a surface state of the fixing roller 90 in a longitudinal direction. When a number of sheets P to be subjected to a fixing process are accumulated, the fixing roller 90 is in contact with an edge part of the sheets P (an edge portion in a direction vertical to a conveying direction of the sheets P, that is, an edge portion in the longitudinal direction of the fixing roller 90), and therefore, fine scratches (edge part scratches) are generated on a surface of the fixing roller 90. If the fixing process is repeatedly performed on the sheets P having the same size in a direction vertical to the conveying direction of the sheets P, the edge part scratches are generated in a fixed position of the fixing roller 90 in the longitudinal direction. A portion of the fixing roller 90 which have the edge part scratches repeatedly generated has a surface which is rougher than other portions. If the fixing device 9 executes the fixing process on a sheet P having a larger size in the direction vertical to the conveying direction of the sheet P in this state, a difference in surface state (a difference in surface roughness) of the fixing roller 90 in the longitudinal direction may be reflected as uneven gloss in a fixed image.

Accordingly, the refreshing roller 80 performs the rubbing process on the fixing roller 90 in accordance with the number of accumulated printed sheets. Since the refreshing roller 80 is in contact with the fixing roller 90 with the difference in a circumferential speed, fine rubbing scratches are generated on the entire surface of the fixing roller 90 in the longitudinal direction (including the portion of the edge part scratches). Since the rubbing scratches are superposed on the edge part scratches generated on the surface of the fixing roller 90, unevenness of the surface state is suppressed and uneven gloss is suppressed.

<Timing of Execution of Refreshing Process>

In this embodiment, the refreshing roller 80 is rotated for 60 seconds while the refreshing roller 80 is in contact with the fixing roller 90 in the refreshing process.

To attain a sufficient effect of the refreshing process, an integration count which counts the number of sheets P printed after a preceding refreshing process for each size in the direction vertical to the conveying direction of the sheets P is disposed in the apparatus 1. The CPU 100 performs the refreshing process in accordance with the integration counter. In this embodiment, an integration counter which counts the number of sheets P of a small size (for example, sheets having a width of A4 or less) is described as an example of the integration counter.

In this embodiment, the refreshing process is performed under a condition (a certain condition) that a value of the integration counter is 1500 or more at an end of the print job. If the refreshing process is performed when the value of the integration counter is 1500, the unevenness of the surface state due to the edge part scratches on the fixing roller 90 is reduced, the uneven gloss of an image is difficult to be visually recognized by the user.

However, if the number of printed sheets P of the small size is increased, the edge part scratches on the surface of the fixing roller 90 become deep. If the edge part scratches are too deep, unevenness of the surface state due to the edge part scratches may not be uniformed even though the rubbing process is repeatedly performed, and accordingly, uneven gloss (vertical streaks corresponding to the edge part scratches) which may be visually recognized by the user may be generated on an image of an output object. In the fixing device 9 of this embodiment, if the value of the integration counter becomes 3000 or more, it is difficult to suppress the uneven gloss even though the rubbing process is performed. Accordingly, in a case where the value of the integration counter reaches 3000, the refreshing process is executed by interrupting an image forming process even during the image forming process.

Note that, in a case where the value of the integration counter is equal to or larger than 1500 and smaller than 3000, it becomes difficult to uniform the unevenness of the surface state by one rubbing process as the number of printed sheets is increased. However, by the refreshing process, the uneven gloss may be suppressed so as to be difficult to be visually recognized by the user.

Specifically, in a case where the certain condition (the condition in which the value of the integration counter is 1500 or more) is satisfied at the end of the print job and the human-body detection sensor 400 does not detect a person at the end of the print job, the refreshing process is performed. After the refreshing process is performed for 60 seconds, the CPU 100 resets the value of the integration counter and counts the number of printed sheets P (the small size) until a next refreshing process is executed. Furthermore, in a case where a person comes near the apparatus 1 in the course of the refreshing process, the refreshing process is interrupted and a standby state is temporarily entered. In a case where the print job is not executed in the temporary standby state, the refreshing process is executed again.

On the other hand, in a case where the human-body detection sensor 400 detects a person at the end of the print job, even if the certain condition (the condition in which the value of the integration counter is 1500 or more) is satisfied at the end of the print job, the CPU 100 postpones the refreshing process and temporarily enters the standby state.

Furthermore, in the image forming process, the refreshing process is performed by intercepting the image forming process every time the value of the integration counter reaches 3000. By this, even in a case where the image forming process is not terminated but continuously performed or a case where the adjustment process is postponed, deterioration of image quality may be suppressed. Accordingly, the number of sheets larger than the certain condition for execution of the adjustment process at the end the image forming process is set as the number of sheets which is a reference for execution of the adjustment process interrupting the image forming process. After the refreshing process is executed, the CPU 100 resets the value of the integration counter and counts the number of sheets P (the small size) printed until the refreshing process is executed.

Note that the values illustrated in this embodiment (such as 1500 and 3000 of the integration counter) including a value of the number of sheets are merely examples, and the values are not limited to these.

<Control from Time Immediately after Image Forming Process is Terminated to Time when Next Image Forming Process is Started>

Figure 13:
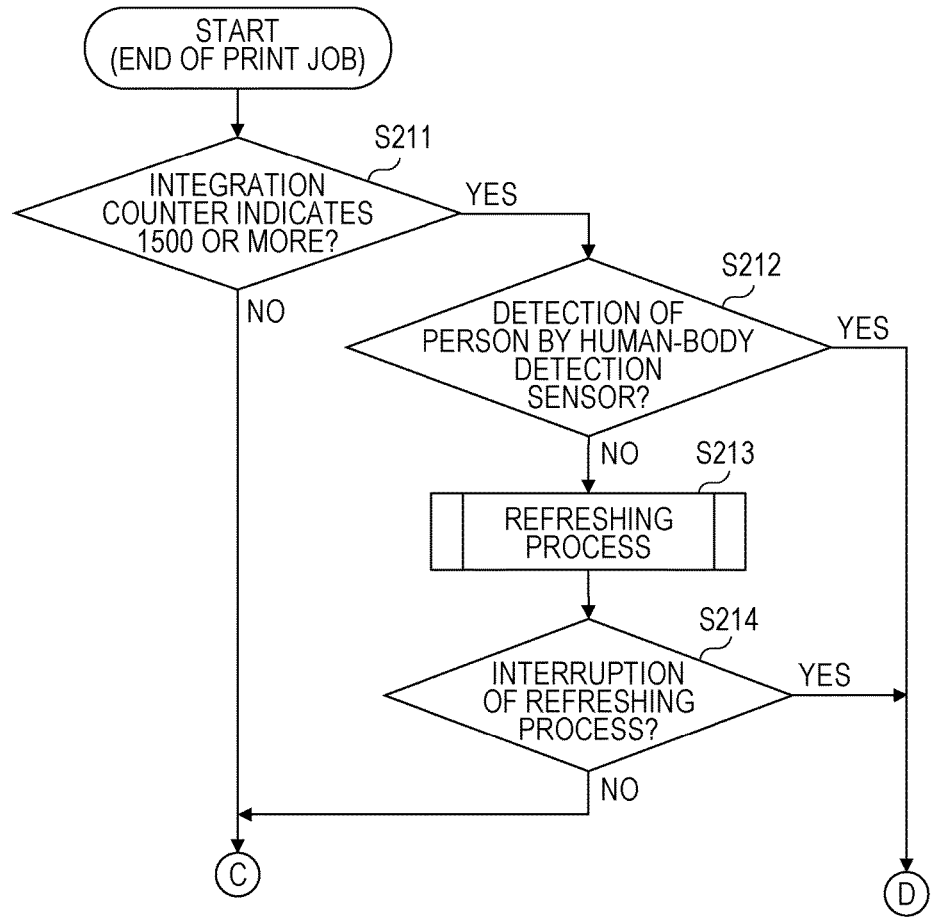
FIG. 13 is a flowchart illustrating a sequence immediately after an image forming process is terminated.
Figure 14:
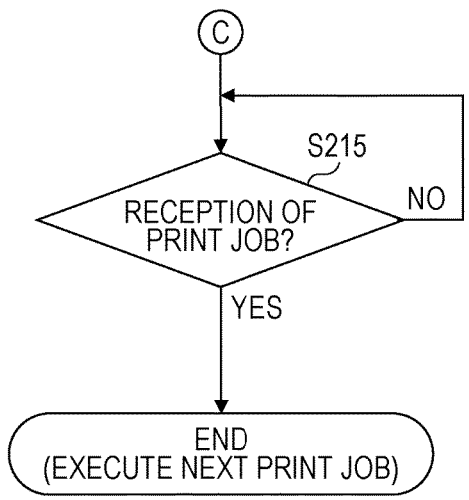
FIG. 14 is a flowchart illustrating the sequence immediately after the image forming process is terminated (continued).
Figure 15:
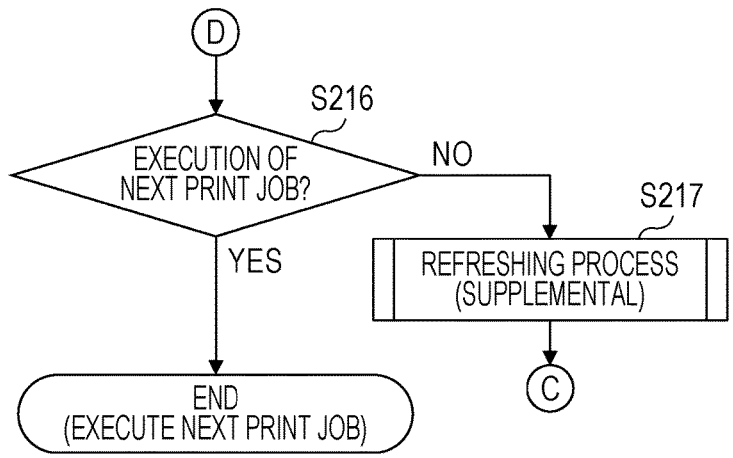
FIG. 15 is a flowchart illustrating the sequence immediately after the image forming process is terminated (continued).

FIG. 13 is a flowchart illustrating a sequence immediately after the image forming process is terminated. FIGS. 14 and 15 are flowcharts illustrating the sequence immediately after the image forming process is terminated (continued). In FIGS. 13 to 15, a process to be performed in a period from an end of the image forming process to start of a next image forming process is illustrated.

When a print job is terminated (that is, an image forming process is terminated), the CPU 100 determines whether the value of the integration counter which counts the number of printed sheets of a small size (here, sheets having a width of A4 or smaller) is 1500 (a predetermined number) or more (S211). Specifically, the CPU 100 determines whether the certain condition is satisfied.

When the value is smaller than 1500, the refreshing process is not performed and a process in step S215 of FIG. 14 is entered. Then, a next print job (a next image forming instruction) is waited. Specifically, in step S215, a standby state in which a next print job is available is entered.

When the value of the integration counter is 1500 or more, it is determined whether the human-body detection sensor 400 has detected a person near the apparatus 1 (S212).

Figure 16:
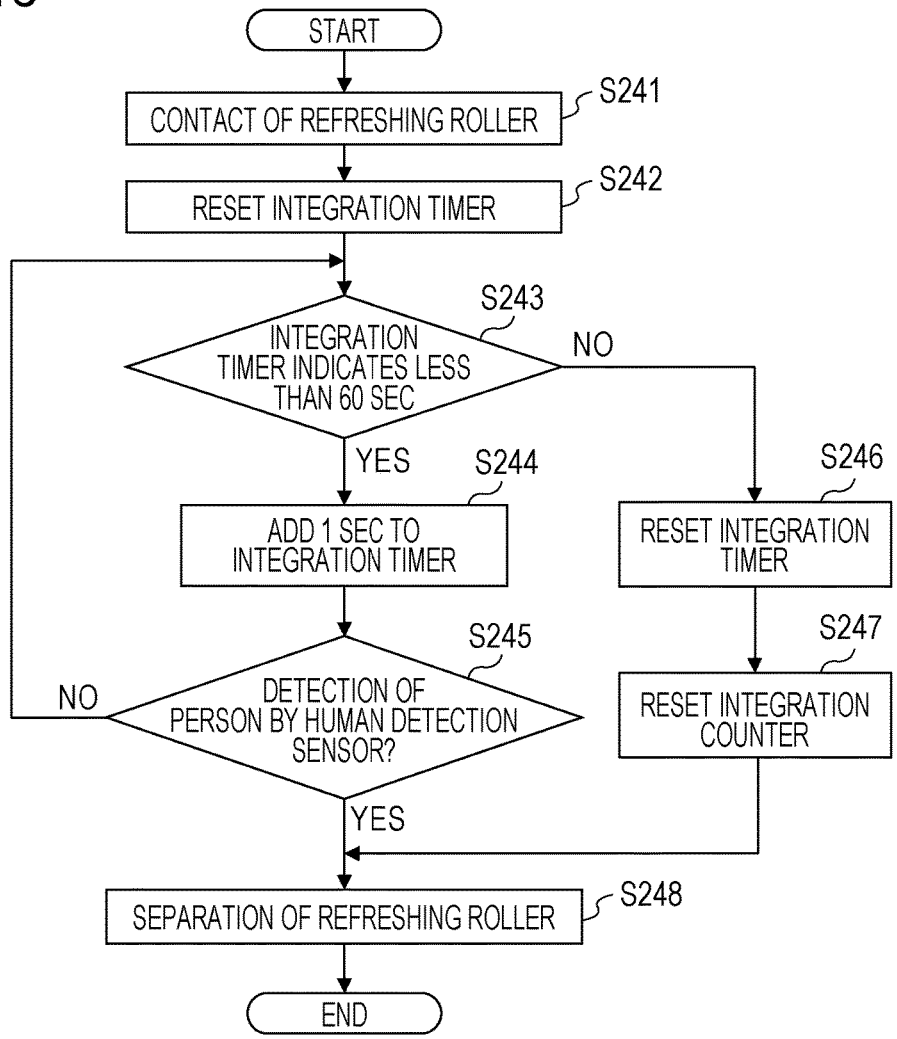
FIG. 16 is a flowchart illustrating a sequence of a refreshing process.

When determining that the human-body detection sensor 400 has not detected a human body near the apparatus 1 at the end of the image forming process (No in step S212), the refresh process described with reference to FIG. 16 is performed (S213). As described below, in a case where the human-body detection sensor 400 detects a person while the CPU 100 performs the refreshing process in step S213, the refreshing process is interrupted. In a case where the refreshing process in step S213 is completed (executed for 60 seconds) (No in step S214), the process proceeds to step S215 of FIG. 14 and a next print job (an image forming instruction) is waited. When the refreshing process in step S213 is interrupted (Yes in step S214), the process proceeds to step S216 of FIG. 15. In step S216, it is determined whether a next print job is to be executed. Specifically, a standby state is temporarily entered. By this, in a case where a person existing near the apparatus 1 at the end of the image forming process during the refreshing process desires to start the image forming process, a waiting time before the person starts the image forming process may be reduced.

Note that the refreshing process of FIG. 16 will be described later in detail. In this embodiment, the CPU 100 determines that the refreshing process is completed in step S214 in a case where the value of the integration timer which measures the rubbing time for refreshing is reset. On the other hand, in a case where the value of the integration timer is not reset (the value indicates 20 seconds (sec), for example), the CPU 100 determines that the refreshing process is interrupted in step S214.

In a case where the value of the integration counter is 1500 or more and it is determined that the human-body detection sensor 400 detects a human body near the apparatus 1 at the end of the image forming process (Yes in step S212), the process proceeds to step S216 (FIG. 15). The CPU 100 determines whether a next print job is to be executed (S216). A determination method in step S216 is the same as that in step S315 of FIG. 7.

When determining that a next print job is to be executed in step S216, the CPU 100 starts a received print job (that is, starts an image forming process). When determining that a next print job is not to be executed in step S216, the CPU 100 executes the refreshing process (supplement) illustrated in FIG. 17, and thereafter, proceeds to step S215 of FIG. 14.

According to the flowcharts illustrated in FIGS. 13 to 15, the CPU 100 starts the image forming process before executing the refreshing process in the following case: a case where the certain condition is satisfied at the end of the image forming process (Yes in step S211), the human-body detection sensor 400 detects a human body at the end of the image forming process (Yes in step S212), and when the print job is executed (Yes in step S216). Accordingly, in a case where a person who desires to start an image forming process exists near the apparatus 1 at the end of the image forming process, the refreshing process may be postponed and the image forming process may be started. Consequently, a waiting time for the user before a next image forming process is started may be reduced.

Furthermore, according to FIGS. 13 to 15, the process in step S217 is executed in the following two cases. First, the process in step 217 is executed in a case where the certain condition is satisfied at the end of the image forming process (Yes in step S211), the human-body detection sensor 400 detects a human body at the end of the image forming process (Yes in step S212), and a print job is not executed (No in step S216). Accordingly, in a case where a person who does not desire to start an image forming process exists near the apparatus 1 at the end of the image forming process, the refreshing process which has been postponed at the end of the image forming process may be executed before a next image forming process is started. As a result, deterioration of image quality may be suppressed in execution of a print job by the next user. Furthermore, the image forming process executed by the next user may be prevented from being interrupted by the refreshing process, and a waiting time until the image forming process of the next user is terminated may be reduced. Second, the process in step 217 is executed in a case where the certain condition is satisfied at the end of the image forming process (Yes in step S211), the refreshing process is interrupted (Yes in step S214) since a human body is detected during the refreshing process (S213), and a print job is not executed (No in step S216). By this, the refreshing process which has been interrupted in a case where a person existing near the apparatus 1 at the end of the image forming process during the refreshing process in step S213 does not desire to start an image forming process may be executed before a next image forming process is started.

<Refreshing Process>

Control of the refreshing process executed in step S213 (FIG. 13) will be described with reference to FIG. 16. FIG. 16 is a flowchart illustrating a sequence of the refreshing process. The refreshing process of this embodiment is characterized in that, in a case where the human-body detection sensor 400 detects a human body near the apparatus 1 during the rubbing process for 60 sec, the rubbing process is interrupted and a waiting state is entered so that a determination as to whether a print job is to be executed is made (S216).

When the refreshing process is started, the CPU 100 brings the refreshing roller 80 into contact with the fixing roller 90 and rotates the refreshing roller 80 and fixing roller 90 (S241). Here, the integration timer which measures an operation time of the rubbing process is reset (0 sec) (S242). The operation time of the rubbing process is measured by the CPU 100 functioning as the integration timer on a RAM 500.

The CPU 100 determines whether a value of the integration timer is smaller than 60 sec (S243). When the value is smaller than 60 sec, the CPU 100 adds 1 sec to the integration timer and continuously performs the rubbing process (S244). Subsequently, the CPU 100 determines whether the human-body detection sensor 400 detects a person near the apparatus 1 (S245). When the human-body detection sensor 400 does not detect a person near the apparatus 1, the process returns to step S243 and the rubbing process is continuously performed.

On the other hand, when the human-body detection sensor 400 detects a person near the apparatus 1 while the integration timer indicates 1 to 59 sec (Yes in step S245), the refreshing roller 80 is separated (S248), the rubbing process is interrupted, and the refreshing process is terminated. Here, the values of the integration timer and the integration counter are not reset. In this case, after the process returns to step S213 of FIG. 13, the CPU 100 proceeds to step S216 and temporarily waits. Since the values of the integration timer and the integration counter are not reset, in a case where a next print job is not to be executed (No in S216 of FIG. 15), the remaining rubbing process which has been interrupted is executed by the refreshing process (supplement) (described later with reference to FIG. 17). Furthermore, in a case where a next print job is to be executed (Yes in S216 of FIG. 15), the remaining rubbing process which has been interrupted is executed by the refreshing process (supplement) performed during the image forming process (described later in FIG. 17).

When the rubbing process is continuously performed until the integration timer reaches 60 sec (No in S243), the CPU 100 resets the integration timer (S246) and the value of the integration counter which counts the number of printed sheets P of the small size is reset (S247). Then the CPU 100 separates the refreshing roller 80 from the fixing roller 90 (248) and terminates the refreshing process.

<Supplementary Refreshing Process>

Figure 17:
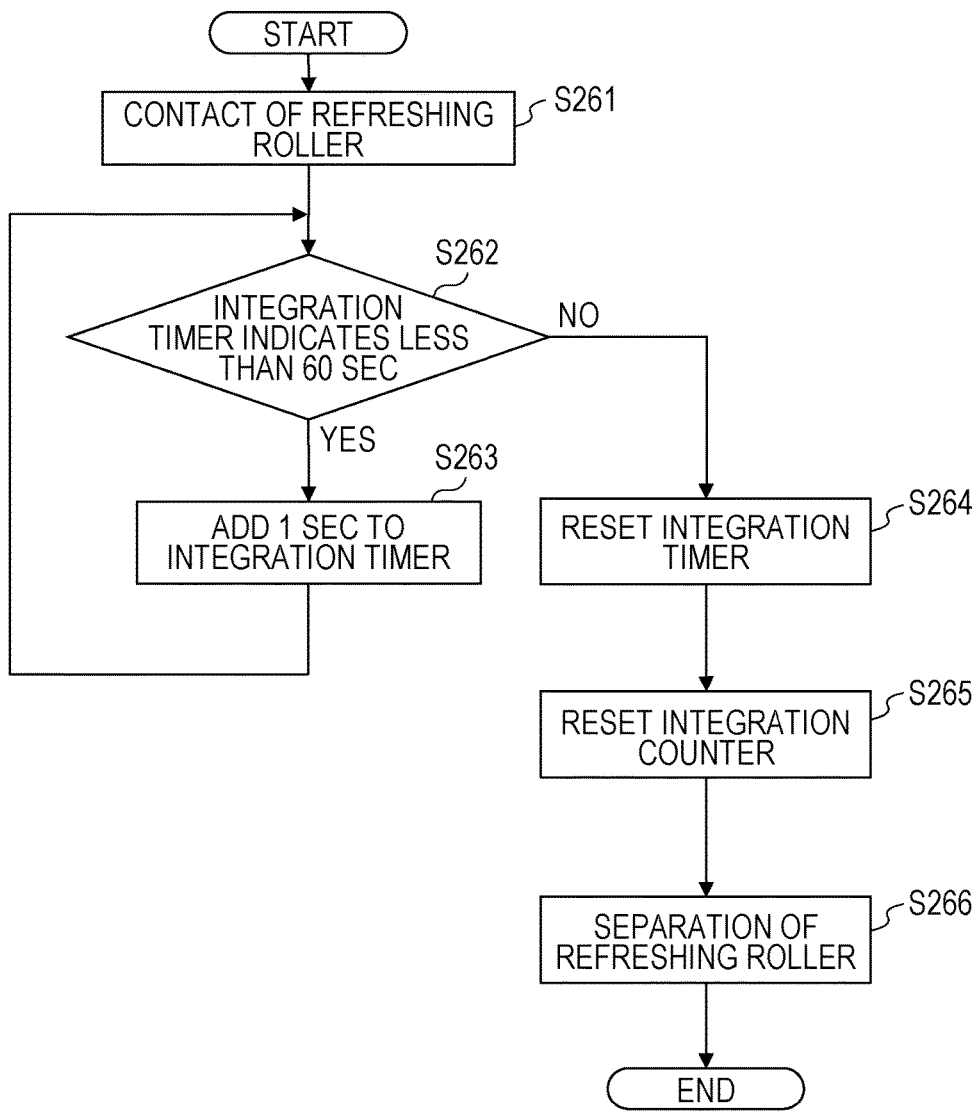
FIG. 17 is a flowchart illustrating a sequence of the refreshing process (supplement).

Control of the refreshing process (supplement) executed in step S217 (FIG. 15) will be described with reference to FIG. 17. FIG. 17 is a flowchart illustrating a sequence of the refreshing process (supplement). The refreshing process (supplement) is set such that the rubbing process is executed irrespective of a result of the detection by the human-body detection sensor 400. Specifically, the refreshing process (supplement) is not interrupted by the human-body detection sensor 400. Furthermore, the integration timer which calculates the operation time of the rubbing process is not reset but starts counting, and therefore, the refreshing process may be supplementarily continued when the refreshing process of FIG. 16 is interrupted.

When the refreshing process (supplement) is started, the CPU 100 brings the refreshing roller 80 into contact with the fixing roller 90 and rotates the refreshing roller 80 and fixing roller 90 (S261). Subsequently, it is determined whether the integration timer which measures an operation time of the rubbing process indicates a value smaller than 60 sec (S262). When the value is smaller than 60 sec, 1 sec is added to the integration timer and the rubbing process is continuously performed (S263). The rubbing process is continuously performed until the integration timer indicates 60 sec. When the integration timer reaches 60 sec (No in S262), the integration timer is reset (S264) and the value of the integration counter is reset (S265). Then the refreshing roller 80 is separated from the fixing roller 90 (S266) and the refreshing process (supplement) is terminated.

<Control in Image Forming Process>

Figure 18:
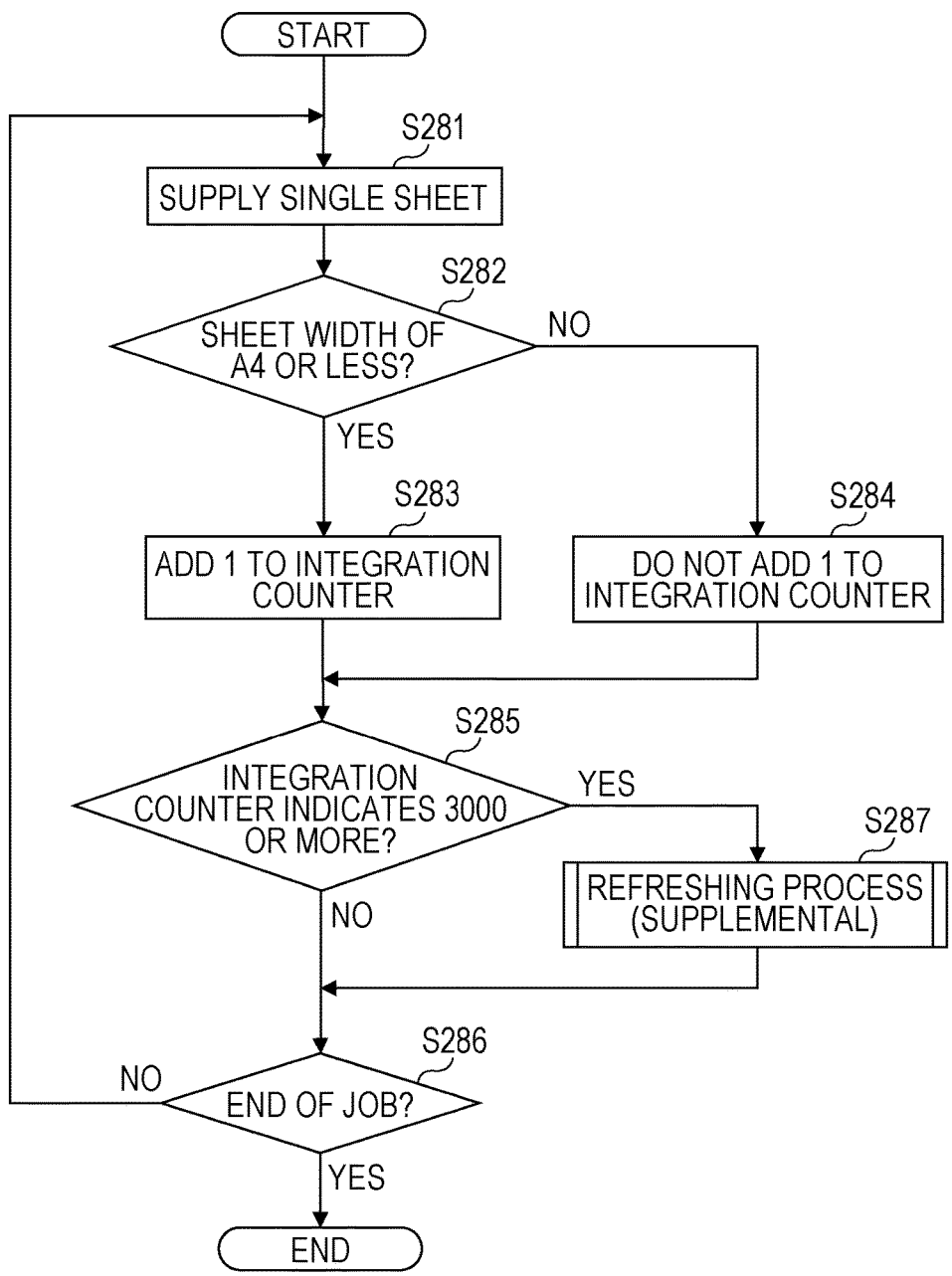
FIG. 18 is a flowchart illustrating a sequence of an image forming process.

Next, control in execution of a print job will be described with reference to FIG. 18. FIG. 18 is a flowchart illustrating a sequence of the image forming process. The rubbing process in the print job of this embodiment is executed by interrupting the execution of the print job when the value of the integration counter reaches 3000.

When the execution of the print job is started, the CPU 100 performs an operation of printing on an each of the sheets P (S281). Here, it is determined whether a width (a size in a direction vertical to a conveying direction) of a sheet conveyed to the fixing device 9 is suitable for integration count (A4 or less) (S282). When the width is equal to or smaller than A4 width, 1 is added to the integration counter (S283), whereas when the width is larger than A4 width, the integration counter is not incremented (S284).

The CPU 100 determines whether the value of the integration counter is 3000 or more (S285). When the value of the integration counter is 3000 or more, the refreshing process (supplement) of FIG. 17 is executed (S287) even if the image forming process is not terminated. Note that, in a case where the value of the integration counter is 3000 or more, the rubbing process is executed until the end irrespective of a result of the determination as to whether a person exists near the apparatus 1 so that generation of uneven gloss on an image of an output object which is visibly recognized by the user is suppressed even if the rubbing process is repeatedly performed. Then it is determined whether the print job has been terminated (S286). When the job has not been terminated, the process returns to step S281 again. When the value of the integration counter is smaller than 3000 in step S285, the refreshing process (supplement) is not executed and the process proceeds to step S286.

As described above, when the value of the integration counter reaches a second number (3000) while the print job is processed, the rubbing process which has been postponed may be executed. By this, even in a case where the image forming process is not terminated but continuously performed or a case where part of or all of the refreshing process is postponed at the end of the image forming process, deterioration of image quality due to generation of uneven gloss may be suppressed.

<Other Configuration>

Although the rubbing time (a determination reference of the integration timer in step S243 and step S262) in the refreshing process is 60 seconds in this embodiment, this value is merely an example, and the rubbing time is not limited to this.

Furthermore, in the refreshing process (S287) performed by interrupting the image forming process being executed, the integration timer may be reset before the rubbing process is started. Specifically, in a case where the image forming process is interrupted, the interruption is performed every certain period of time (60 seconds, for example), irrespective of a value of the integration timer obtained when the process in step S287 is started.

Furthermore, in the refreshing process (S287) which interrupts the image forming process, the rubbing time which is longer than that of the refreshing process in step S213 (FIG. 13) may be set taking the number of accumulated sheets which is larger than a predetermined number of sheets (1500 in this embodiment) into consideration.

Furthermore, although only one type of sheet which is a small size is counted by the integration counter in this embodiment, a plurality of integration counters which count sheets of different sizes may be provided and a determination that the number of sheets of one of the sizes reaches a certain number at the end of the image forming process may be set as the certain condition.

(7) Control Block Diagram

Figure 19:
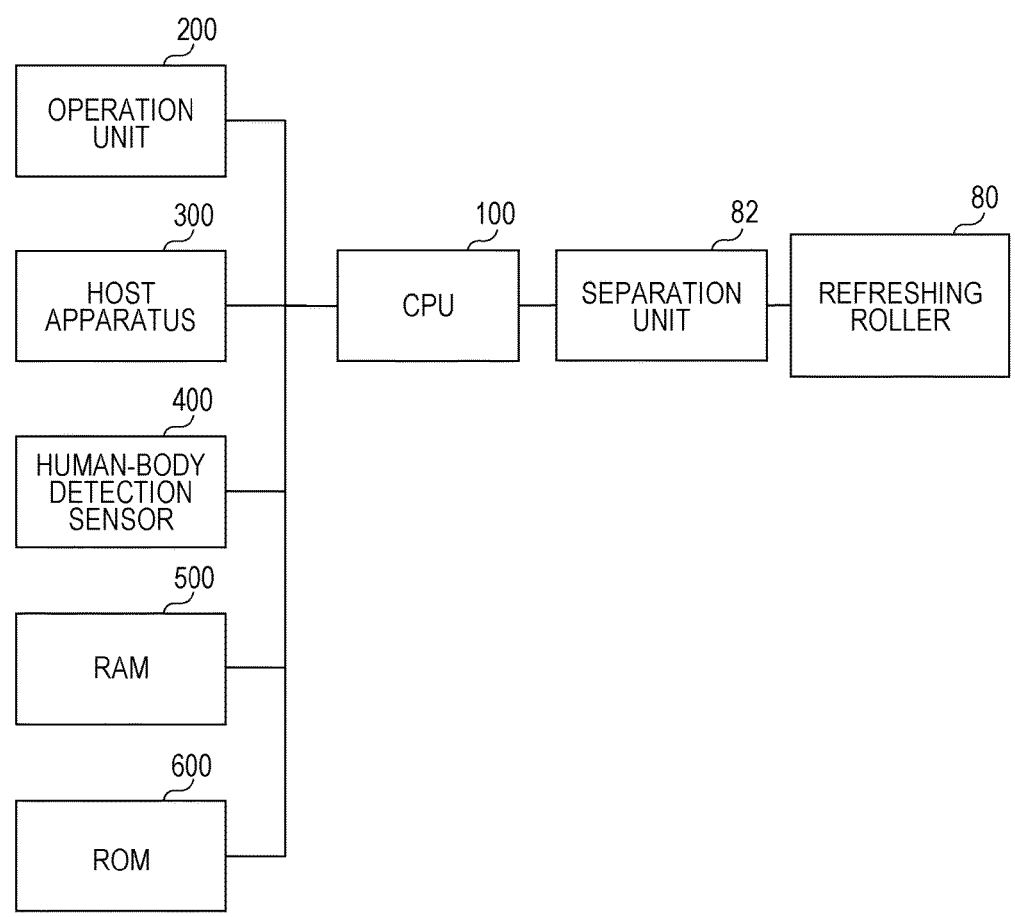
FIG. 19 is a control block diagram.

FIG. 19 is a control block diagram which illustrates a hardware configuration mainly including the CPU 100 according to this embodiment. The CPU 100 is electrically connected to an operation unit 200, a host apparatus 300, the human-body detection sensor 400, the RAM 500, a ROM 600, and a separation unit 82. Furthermore, the CPU 100 is electrically connected to the refreshing roller 80 through the separation unit 82. The CPU 100 serving as a controller controls the components electrically connected to the CPU 100 in accordance with programs stored in the RAM 500. The programs may be stored in the ROM 600.

Fourth Embodiment

A postponed adjustment process is not limited to the density adjustment control according to the first and second embodiments and the refreshing process according to the third embodiment. Examples of the postponed adjustment process include voltage control performed by a transfer unit and adjustment of a charging potential of the drums 2 by a charging unit. The examples further include adjustment of an amount of toner supplied to a developing container in a developing unit. Furthermore, the examples of the postponed adjustment process widely include adjustment operations associated with an image forming unit and a fixing unit of an image forming apparatus, such as position adjustment for correcting a shift of transfer positions of toner images among four color units and various types of cleaning.

Fifth Embodiment

Although the value of the integration counter which counts the number of printed sheets is used as the certain condition associated with execution of the adjustment process in the foregoing embodiments, the certain condition is not limited to this. For example, a state in which a certain period of time (10 minutes, for example) has elapsed after a reference timing at an end of an image forming process may be set as the certain condition. Specifically, an elapsed time from a preceding adjustment process to termination of the image forming process may be set as a reference. In this case, when a period of time (15 minutes, for example) longer than the certain period of time after the reference timing has elapsed, the adjustment process is executed by interrupting the image forming process.

Furthermore, a trigger for inserting the adjustment process may be determined instead of the certain condition described above. For example, in a case where temperature and humidity near the apparatus 1 are changed by predetermined values or more, the adjustment process may be executed even if the certain condition is not satisfied.

Sixth Embodiment

In the foregoing description, in the case where the certain condition is satisfied at the end of the image forming process and the human-body detection sensor 400 detects a human body near the apparatus 1 at the end of the image forming process, the adjustment process is postponed and control for a state in which a next print job is waited is preferentially performed on a temporary basis. This is referred to as a print preferential mode in this embodiment.

In this embodiment, the user may determine whether the print preferential mode is to be executed in advance. Hereinafter, a case where the print preferential mode is applied to the adjustment process of the first embodiment will be described as an example.

In a case where the print preferential mode is to be executed, the control in the first embodiment is executed.

On the other hand, in a case where the print preferential mode is not to be executed, a case where the certain condition is satisfied at the end of the image forming process, and a case where the human-body detection sensor 400 detects a human body near the apparatus 1 at the end of the image forming process, the adjustment process is not postponed. Specifically, irrespective of a result of the determination in step S312 of FIG. 5 (the first embodiment), that is, irrespective of a result of the determination as to whether the human-body detection sensor 400 has detected a person, the adjustment process in step S313 of FIG. 5 is executed (an adjustment preferential mode).

The determination as to whether the print preferential mode is to be executed (that is, a selection from among the print preferential mode and the adjustment preferential mode to be executed) is accepted by the operation unit 200 serving as a selection unit (a selector). An operator operates the operation unit 200 to set one of the print preferential mode and the adjustment preferential mode to be executed. The CPU 100 functions as an execution unit which preferentially executes the mode selected by the operation unit 200 and which may selectively execute any one of the print preferential mode and the adjustment preferential mode.

Note that, although the configuration in which a mode to be executed by the CPU 100 is selectable is applied to the apparatus 1 of the first embodiment in this embodiment, the configuration may be applied to the other embodiments. For example, if the configuration is applied to the second embodiment, the adjustment process in step S353 of FIG. 10 is performed in the adjustment preferential mode irrespective of a result of the determination in step S352 of FIG. 10.

Furthermore, in the third embodiment, the user may select and set two modes for the refreshing process executed in step S213. Specifically, as one of the two modes, a mode in which, as with the third embodiment, a refreshing operation is interrupted and a standby state is preferentially entered in a case where the human-body detection sensor 400 detects a person during the refreshing process executed in step S213 (Yes in step S245 of FIG. 16) (the print preferential mode) may be selected and set. As the other of the two modes, a mode in which the refreshing process is performed in accordance with the integration timer instead of a result of the determination performed in step S245 (the adjustment preferential mode) may be selected and set.

The user may select the print preferential mode for reducing a waiting time of the user who desires to start a next print job by postponing the adjustment process or the adjustment preferential mode for improving quality stability of an output object by executing the adjustment process. By this, the apparatus 1 may also cope with a user who desires to ensure quality stability of an output object. Control suitable for needs of the user may be executed, and usability may be improved.

Other Configurations

Although the case where the apparatus 1 is a color image forming apparatus having the four forming units (the units UY, UM, UC, and UK) which form toner images of yellow, magenta, cyan, and black is described as an example in the foregoing description, a single-color image forming apparatus may be employed. Examples of the single-color image forming apparatus include a monochrome image forming apparatus which forms a toner image of black.

Furthermore, although the apparatus 1 has the intermediate transfer belt 8 serving as the intermediate transfer body (an intermediate transfer method) in the foregoing description, a direct transfer method for directly transferring a toner image from the forming units to a sheet P may be employed. In this case, a transfer conveying belt which conveys the sheet P while electrostatically absorbing the sheet P and a transfer roller in a position facing to the image forming units through the transfer conveying belt (on an inner side of the belt) are provided. The transfer roller transfers a toner image formed on an image carrier on the sheet P which is conveyed by the transfer conveying belt. By this, a toner image (unfixed) is formed on the sheet P.

According to embodiments of the present invention, possibility of degradation of image quality may be suppressed while increase of a waiting time before a user who desires to start a next image forming process after an end of a certain image forming process obtains a first output object is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2015/082350 filed Nov. 18, 2015, which is hereby incorporated by reference herein in its entirety.

The invention claimed is:

1. An image forming apparatus comprising:
an image forming device configured to form an image on a recording material;
a detector configured to detect presence of a human body in a predetermined region;
a controller configured to control as to whether to execute an adjustment process operation for the image forming device, depending on whether the detector detects the presence of the human body at an end of an image forming process; and
an instruction receiver configured to receive an instruction for a start of an image forming process,
wherein, in a case where the detector does not detect the presence of the human body at the end of the image forming process, the controller executes the adjustment process operation for the image forming device,
wherein, in a case where the detector detects the presence of the human body at the end of the image forming process and the instruction receiver receives the instruction within a predetermined period of time after the end of the image forming process, the controller starts the image forming process corresponding to the received instruction before the execution of the adjustment process operation, and
wherein, in a case where the detector detects the presence of the human body at the end of the image forming process and the predetermined period of time has elapsed without receiving the instruction by the instruction receiver after the end of the image forming process, the controller executes the adjustment process operation for the image forming device.

2. The image forming apparatus according to claim 1, wherein, in a case where a number of recording materials on which the images are formed by the image forming device reaches a predetermined number at the end of the image forming process, the controller determines whether the adjustment process operation is to be executed.

3. The image forming apparatus according to claim 2,
wherein the predetermined number is a first predetermined number, and
wherein, in a case where the number of recording materials on which the images are formed by the image forming device reaches a second predetermined number that is larger than the first predetermined number, the controller executes the adjustment process operation when the image forming process is terminated, irrespective of an output of the detector.

4. The image forming apparatus according to claim 1, wherein, in a case where an elapsed time from a reference time point reaches a predetermined elapsed time at the end of the image forming process, the controller determines whether to execute the adjustment process operation.

5. The image forming apparatus according to claim 4,
wherein the predetermined elapsed time is a first predetermined elapsed time, and
wherein, in a case where an elapsed time from the reference time point reaches a second predetermined elapsed time which is longer than the first predetermined elapsed time, the controller executes the adjustment process operation when the image forming process is terminated, irrespective of an output of the detector.

6. The image forming apparatus according to claim 1,
wherein the image forming device includes a photoreceptor and a forming device which forms a toner image on the photoreceptor, and
wherein the controller controls the forming device to form pattern images, for determination of an image forming condition for the image forming device, on the photoreceptor in the adjustment process operation.

7. The image forming apparatus according to claim 1, further comprising an execution device configured to execute a process of activating the instruction receiver when the detector detects the presence of the human body in a state in which the instruction receiver is powered off.

8. The image forming apparatus according to claim 1, wherein the end of the image forming process is a point in time at which a last sheet in the image forming process has been ejected to outside of the image forming apparatus.

9. The image forming apparatus according to claim 1,
wherein the image forming device includes a photoreceptor and an exposure device that performs exposure for an electrostatic latent image on the photoreceptor, and
wherein the end of the image forming process is a point in time at which exposure for an electrostatic latent image corresponding to a last image in the image forming process has been performed by the exposure device.

10. An image forming apparatus comprising:
an image forming device configured to form an image on a recording material;
a detector configured to detect presence of a human body in a predetermined region;
a controller configured to control as to whether to execute an adjustment process operation for the image forming device, depending on whether the detector detects the presence of the human body at an end of an image forming process; and
an instruction receiver configured to receive an instruction for a start of an image forming process,
wherein, in a case where the detector does not detect the presence of the human body at the end of the image forming process, the controller executes the adjustment process operation for the image forming device,
wherein, in a case where the detector continuously detects the presence of the human body after the end of the image forming process and the instruction receiver receives the instruction within a predetermined period of time after the end of the image forming process, the controller starts the image forming process corresponding to the received instruction before the execution of the adjustment process operation, and
wherein, in a case where the detector continuously detects the presence of the human body after the end of the image forming process and the predetermined period of time has elapsed without receiving the instruction by the instruction receiver after the end of the image forming process, the controller executes the adjustment process operation for the image forming device.

11. The image forming apparatus according to claim 10, wherein, in a case where a number of recording materials on which the images are formed by the image forming device reaches a predetermined number at the end of the image forming process, the controller determines whether the adjustment process operation is to be executed.

12. The image forming apparatus according to claim 11,
wherein the predetermined number is a first predetermined number, and
wherein, in a case where the number of recording materials on which the images are formed by the image forming device reaches a second predetermined number that is larger than the first predetermined number, the controller executes the adjustment process operation when the image forming process is terminated, irrespective of an output of the detector.

13. The image forming apparatus according to claim 10, wherein, in a case where an elapsed time from a reference time point reaches a predetermined elapsed time at the end of the image forming process, the controller determines whether to execute the adjustment process operation.

14. The image forming apparatus according to claim 13,
wherein the predetermined elapsed time is a first predetermined elapsed time, and
wherein, in a case where an elapsed time from the reference time point reaches a second predetermined elapsed time which is longer than the first predetermined elapsed time, the controller executes the adjustment process operation when the image forming process is terminated, irrespective of an output of the detector.

15. The image forming apparatus according to claim 10,
wherein the image forming device includes a photoreceptor and a forming device which forms a toner image on the photoreceptor, and
wherein the controller controls the forming device to form pattern images, for determination of an image forming condition for the image forming device, on the photoreceptor in the adjustment process operation.

16. The image forming apparatus according to claim 10, further comprising an execution device configured to execute a process of activating the instruction receiver when the detector detects the presence of the human body in a state in which the instruction receiver is powered off.

17. The image forming apparatus according to claim 10, wherein the end of the image forming process is a point in time at which a last sheet in the image forming process has been ejected to outside of the image forming apparatus.

18. The image forming apparatus according to claim 10,
wherein the image forming device includes a photoreceptor and an exposure device that performs exposure for an electrostatic latent image on the photoreceptor, and
wherein the end of the image forming process is a point in time at which exposure for an electrostatic latent image corresponding to a last image in the image forming process has been performed by the exposure device.

19. An image forming apparatus comprising:
an image forming device configured to form an image on a recording material;
a fixing device configured to fix the image, formed by the image forming device, on the recording material;
a detector configured to detect presence of a human body in a predetermined region;
a controller configured to control as to whether to execute an adjustment process operation for the fixing device, depending on whether the detector detects the presence of the human body at an end of an image forming process; and
an instruction receiver configured to receive an instruction for a start of an image forming process,
wherein, in a case where the detector does not detect the presence of the human body at the end of the image forming process, the controller executes the adjustment process operation for the fixing device,
wherein, in a case where the detector detects the presence of the human body at the end of the image forming process and the instruction receiver receives the instruction within a predetermined period of time after the end of the image forming process, the controller starts the image forming process corresponding to the received instruction before the execution of the adjustment process operation, and
wherein, in a case where the detector detects the presence of the human body at the end of the image forming process and the predetermined period of time has elapsed without receiving the instruction by the instruction receiver after the end of the image forming process, the controller executes the adjustment process operation for the fixing device.

20. An image forming apparatus comprising:
an image forming device configured to form an image on a recording material;
a fixing device configured to fix the image, formed by the image forming device, on the recording material;
a detector configured to detect presence of a human body in a predetermined region;
a controller configured to control as to whether to execute an adjustment process operation for the fixing device, depending on whether the detector detects the presence of the human body at an end of an image forming process; and
an instruction receiver configured to receive an instruction for a start of an image forming process,
wherein, in a case where the detector does not detect the presence of the human body at the end of the image forming process, the controller executes the adjustment process operation for the fixing device,
wherein, in a case where the detector continuously detects the presence of the human body after the end of the image forming process and the instruction receiver receives the instruction within a predetermined period of time after the end of the image forming process, the controller starts the image forming process corresponding to the received instruction before the execution of the adjustment process operation, and
wherein, in a case where the detector continuously detects the presence of the human body after the end of the image forming process and the predetermined period of time has elapsed without receiving the instruction by the instruction receiver after the end of the image forming process, the controller executes the adjustment process operation for the fixing device.

21. An image forming apparatus comprising:
an image forming device configured to form an image on a recording material;
a detector configured to detect presence of a human body in a predetermined region;
an instruction receiver configured to receive an instruction for a start of an image forming process; and
a controller configured to selectively execute one of a plurality modes including a first mode and a second mode,
wherein, in the first mode and in a case where the detector does not detect the presence of the human body at an end of the image forming process, the controller executes an adjustment process operation for the image forming device,
wherein, in the first mode and in a case where the detector detects the presence of the human body at the end of the image forming process and the instruction receiver receives the instruction within a predetermined period of time after the end of the image forming process, the controller starts the image forming process corresponding to the received instruction before the execution of the adjustment process operation,
wherein, in the first mode and in a case where the detector detects the presence of the human body at the end of the image forming process and the predetermined period of time has elapsed without receiving the instruction by the instruction receiver after the end of the image forming process, the controller executes the adjustment process operation for the image forming device, and
wherein, in the second mode, the controller executes the adjustment process operation for the image forming device when the image forming process is terminated, irrespective of an output of the detector; and a selector configured to accept a selection of a mode that is to be executed by the controller among the plurality of modes.

22. The image forming apparatus according to claim 21, wherein, in a case where a number of recording materials on which the images are formed by the image forming device reaches a predetermined number at the end of the image forming process, the controller determines whether to execute the adjustment process operation for the image forming device.

23. The image forming apparatus according to claim 21, wherein, in a case where an elapsed time from a reference time point reaches a predetermined elapsed time at the end of the image forming process, the controller determines whether to execute the adjustment process operation for the image forming device.

* * * * *